United States Patent
Kinnebrew et al.

(10) Patent No.: US 9,696,547 B2
(45) Date of Patent: Jul. 4, 2017

(54) MIXED REALITY SYSTEM LEARNED INPUT AND FUNCTIONS

(75) Inventors: Peter Tobias Kinnebrew, Seattle, WA (US); Nicholas Ferianc Kamuda, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 558 days.

(21) Appl. No.: 13/532,664

(22) Filed: Jun. 25, 2012

(65) Prior Publication Data

US 2013/0342571 A1    Dec. 26, 2013

(51) Int. Cl.
| | |
|---|---|
| G06T 15/00 | (2011.01) |
| G02B 27/01 | (2006.01) |
| G06F 3/147 | (2006.01) |
| G06F 3/01 | (2006.01) |

(52) U.S. Cl.
CPC ............ *G02B 27/017* (2013.01); *G06F 3/011* (2013.01); *G06F 3/147* (2013.01); *G02B 2027/014* (2013.01); *G02B 2027/0178* (2013.01); *G09G 2340/12* (2013.01)

(58) Field of Classification Search
None
See application file for complete search history.

(56) References Cited

U.S. PATENT DOCUMENTS

| | | | |
|---|---|---|---|
| 6,191,773 B1* | 2/2001 | Maruno | G06F 3/017 345/156 |
| 6,779,060 B1 | 8/2004 | Azvine et al. | |
| 7,630,901 B2 | 12/2009 | Omi | |
| 8,108,776 B2 | 1/2012 | Gopalakrishnan | |
| 2008/0114710 A1* | 5/2008 | Pucher | 706/20 |
| 2008/0192005 A1* | 8/2008 | Elgoyhen et al. | 345/158 |
| 2009/0253107 A1 | 10/2009 | Marggraff | |
| 2010/0149090 A1* | 6/2010 | Morris et al. | 345/156 |
| 2010/0169246 A1 | 7/2010 | Jang et al. | |
| 2010/0231522 A1* | 9/2010 | Li | 345/169 |
| 2010/0309390 A1* | 12/2010 | Plut | 348/744 |
| 2011/0205243 A1* | 8/2011 | Matsuda | 345/633 |
| 2011/0242134 A1* | 10/2011 | Miller et al. | 345/633 |
| 2012/0113142 A1* | 5/2012 | Adhikari | G06Q 30/0623 345/633 |
| 2012/0249443 A1* | 10/2012 | Anderson | A63F 13/06 345/173 |

(Continued)

OTHER PUBLICATIONS

Dumas, et al., "Multimodal Interfaces: A Survey of Principles, Models and Frameworks", In Book of Human Machine Interaction, Dec. 29, 2009, pp. 3-26.

(Continued)

*Primary Examiner* — Andrew G Yang
(74) *Attorney, Agent, or Firm* — Vierra Magen Marcus LLP

(57) ABSTRACT

A see-through, near-eye, mixed reality display apparatus providing a mixed reality environment wherein one or more virtual objects and one or more real objects exist within the view of the device. Each of the real and virtual have a commonly defined set of attributes understood by the mixed reality system allowing the system to manage relationships and interaction between virtual objects and other virtual objects, and virtual and real objects.

20 Claims, 21 Drawing Sheets

(56) References Cited

U.S. PATENT DOCUMENTS

| | | | |
|---|---|---|---|
| 2012/0249741 A1* | 10/2012 | Maciocci | G06F 3/011 348/46 |
| 2012/0324213 A1* | 12/2012 | Ho | G06F 1/1626 713/100 |
| 2012/0326961 A1* | 12/2012 | Bromer | 345/156 |
| 2013/0021374 A1* | 1/2013 | Miao | G06F 3/011 345/633 |
| 2013/0038510 A1 | 2/2013 | Brin et al. | |
| 2013/0044042 A1 | 2/2013 | Olsson et al. | |
| 2013/0050069 A1* | 2/2013 | Ota | 345/156 |
| 2013/0083018 A1* | 4/2013 | Geisner | G06F 3/011 345/420 |
| 2013/0147836 A1* | 6/2013 | Small | G06F 3/011 345/633 |

OTHER PUBLICATIONS

Huang, et al., "Combining User Modeling and Machine Learning to Predict Users' Multimodal Integration Patterns", In Third International Workshop on Machine Learning for Multimodal Interaction, Lecture Notes in Computer Science, vol. 4299, May 1, 2006, pp. 50-62.

* cited by examiner

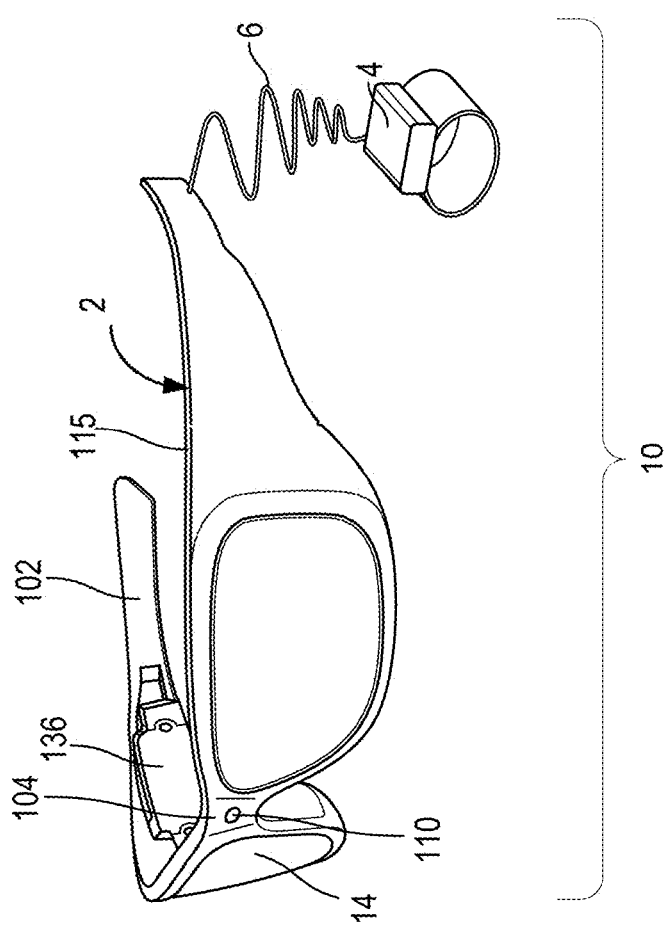

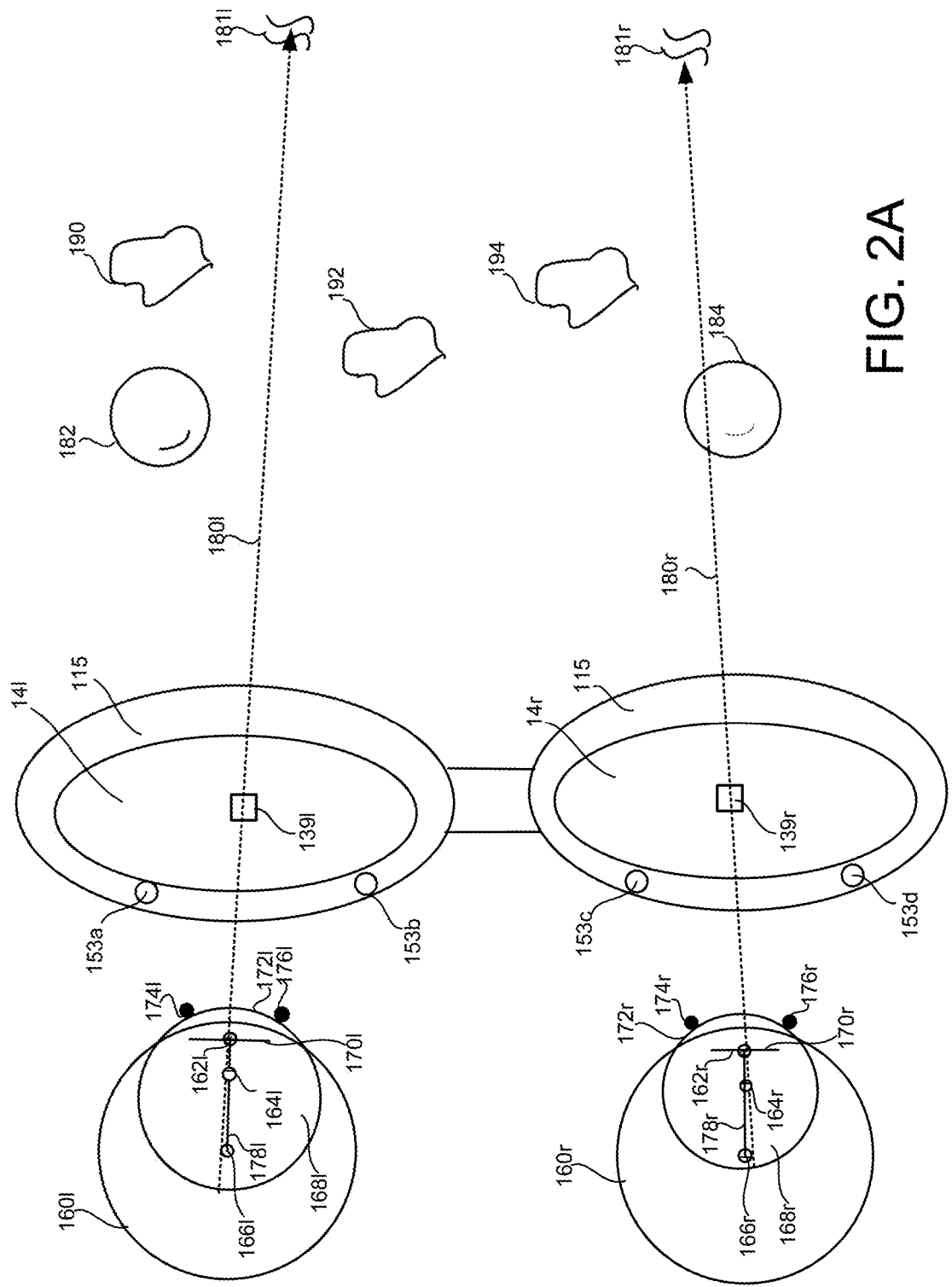

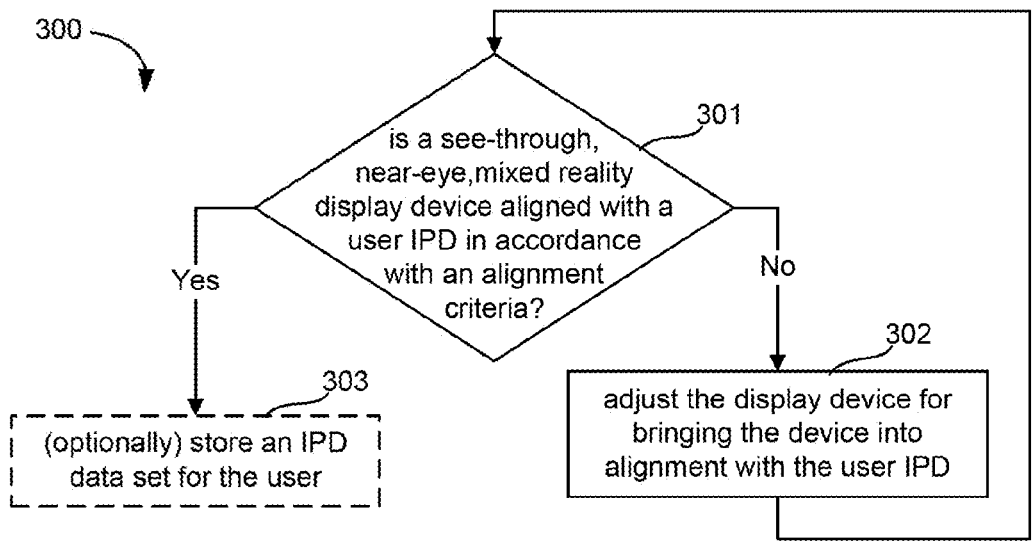
FIG. 3A
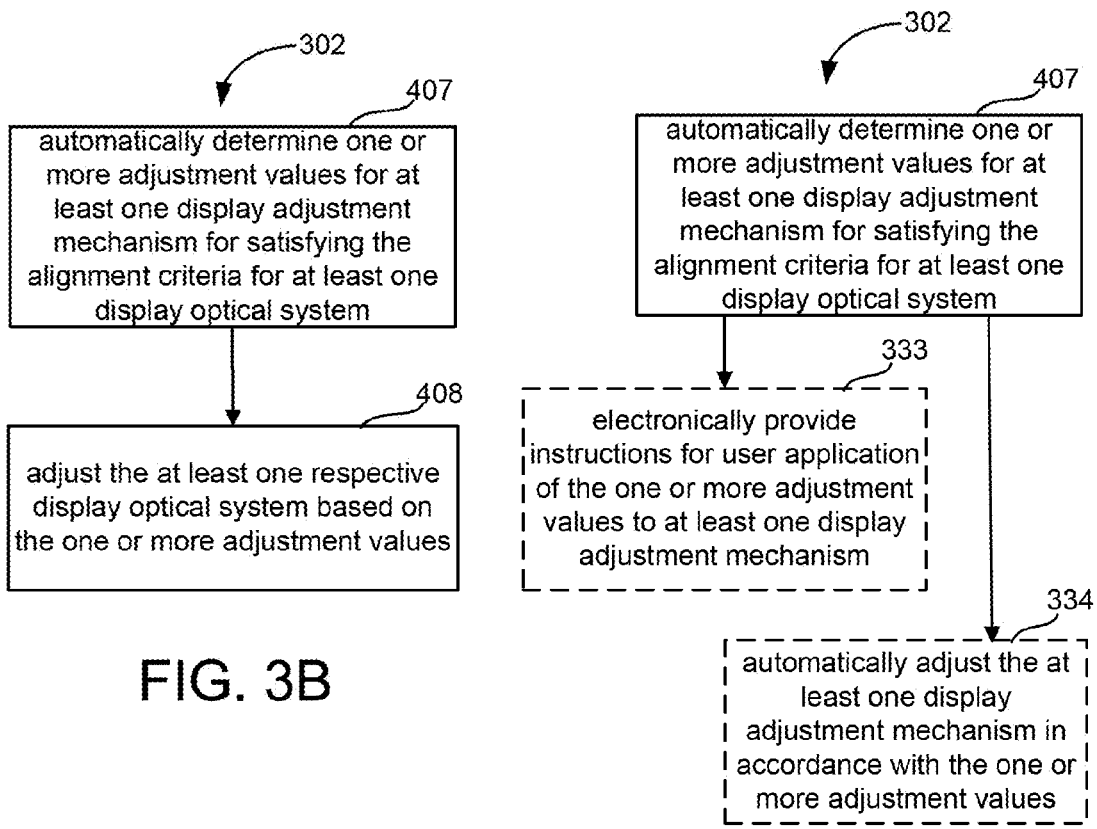
FIG. 3B
FIG. 3C

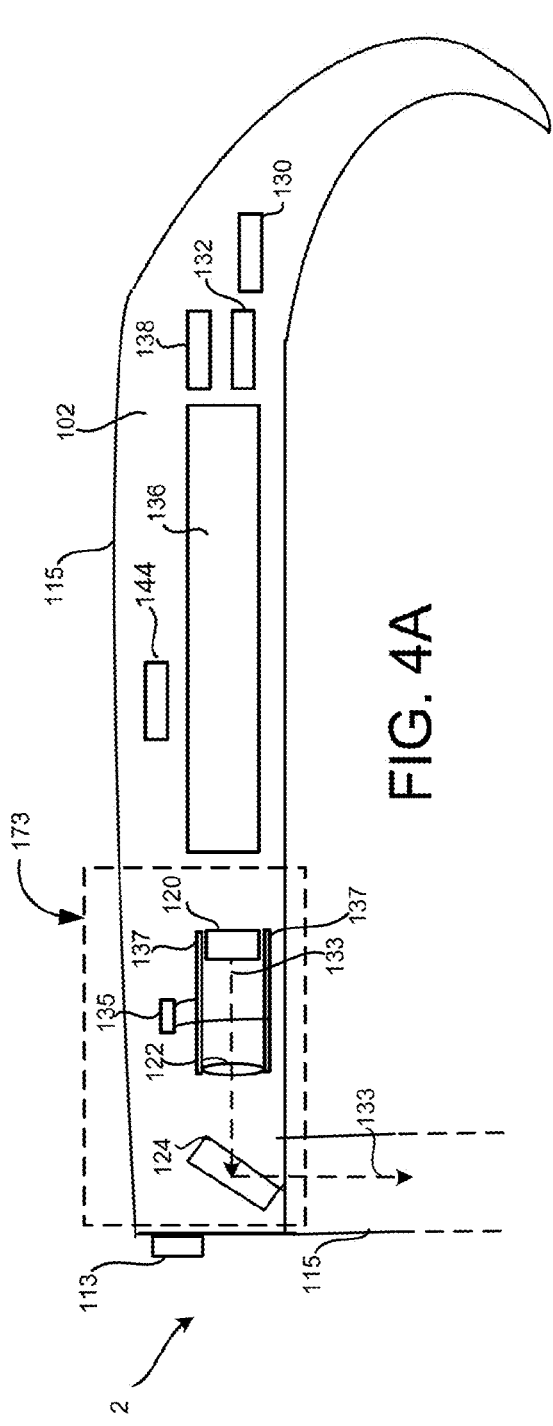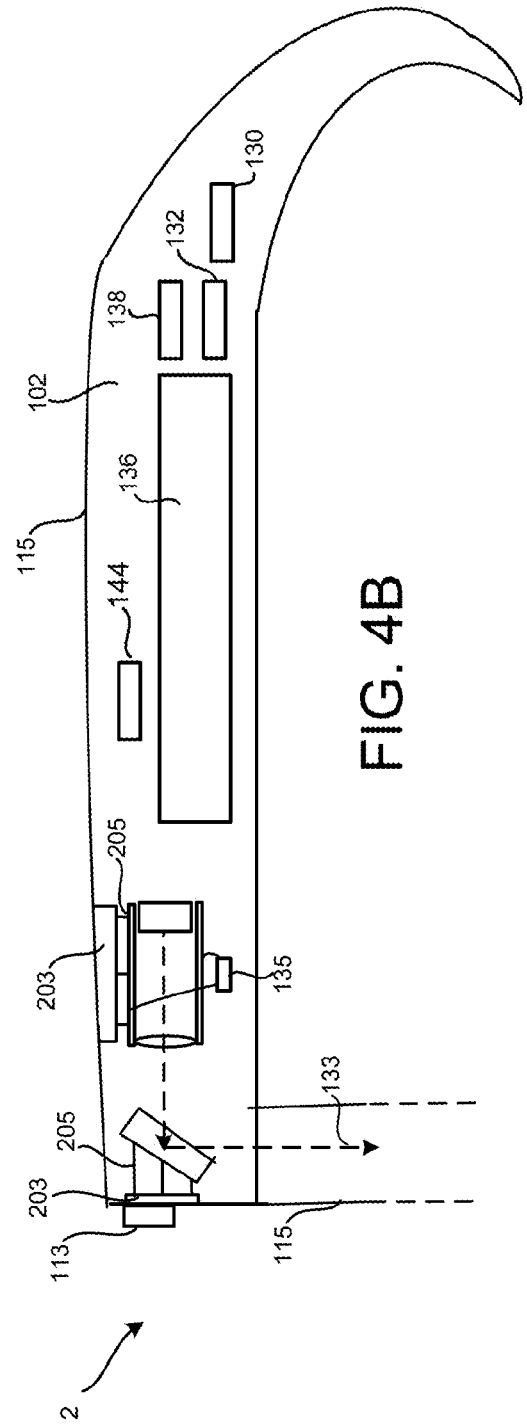

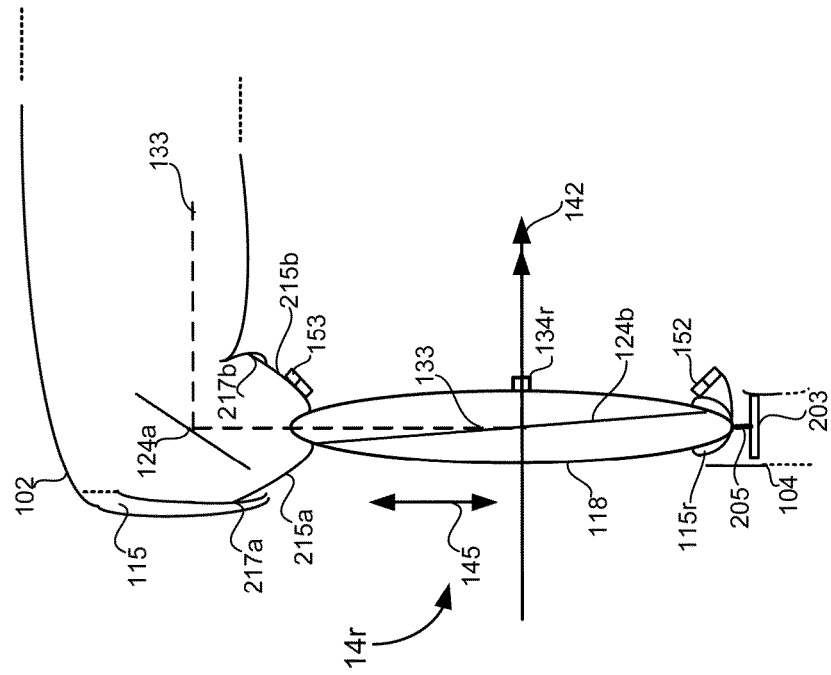
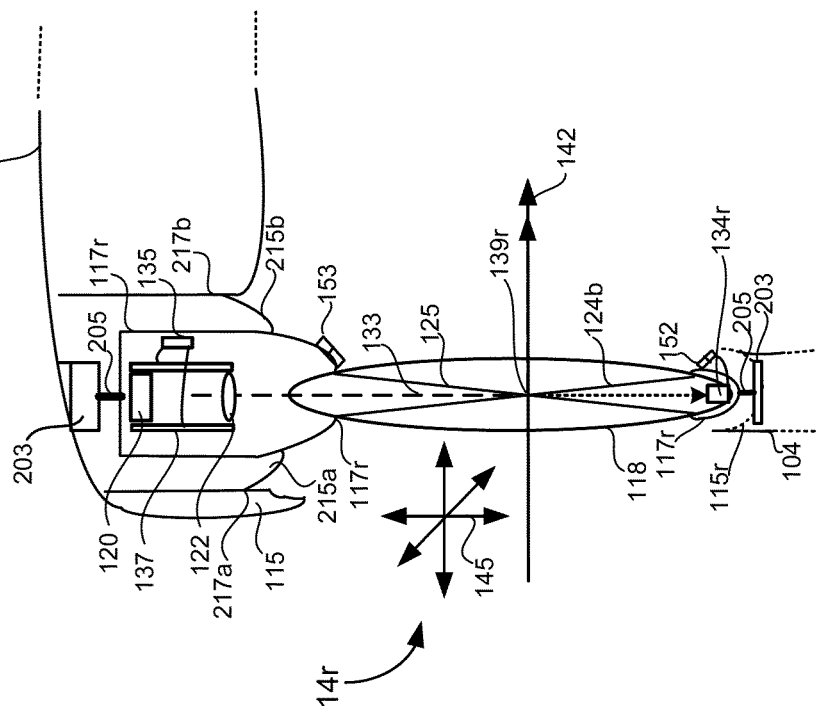

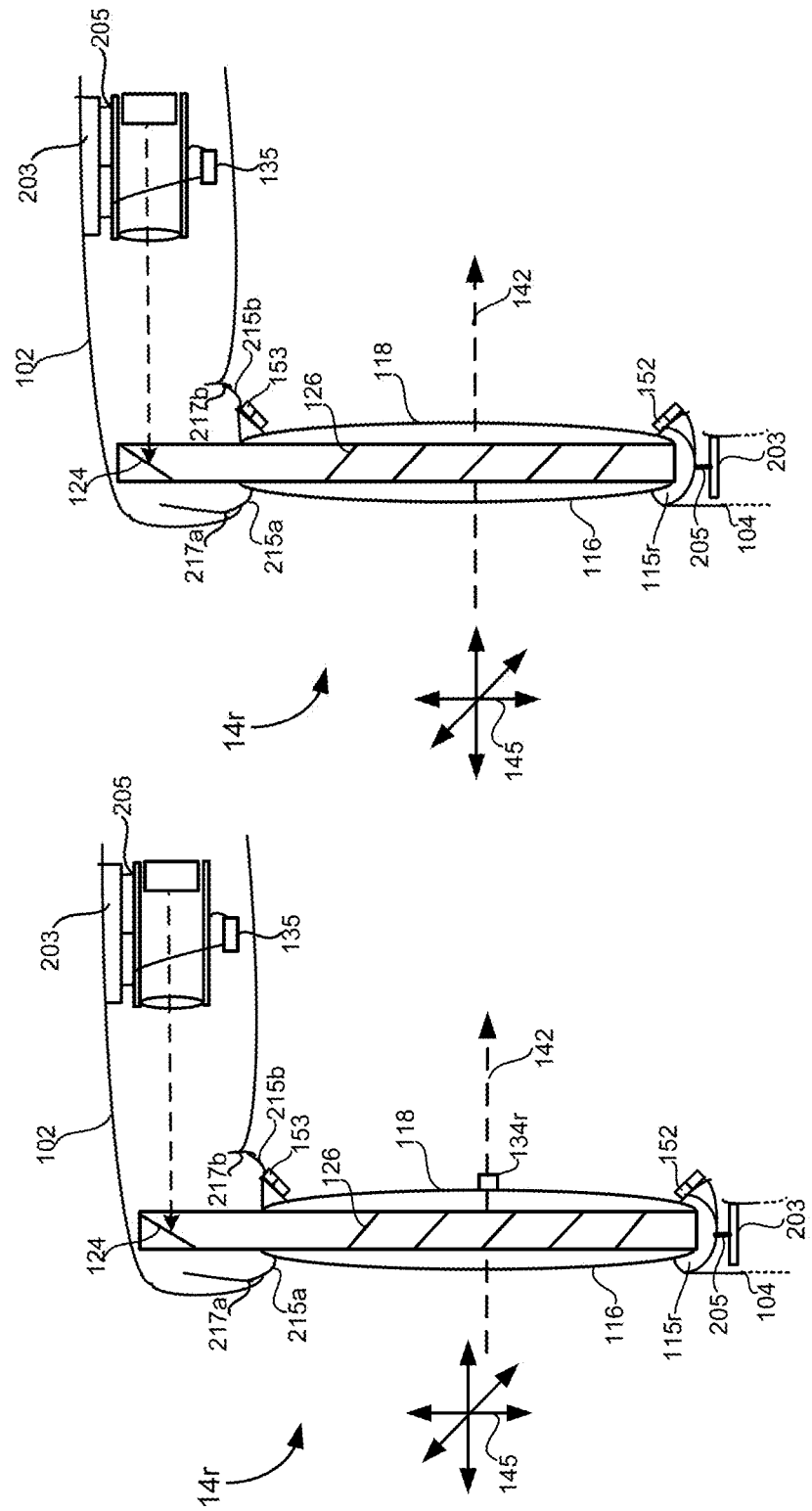

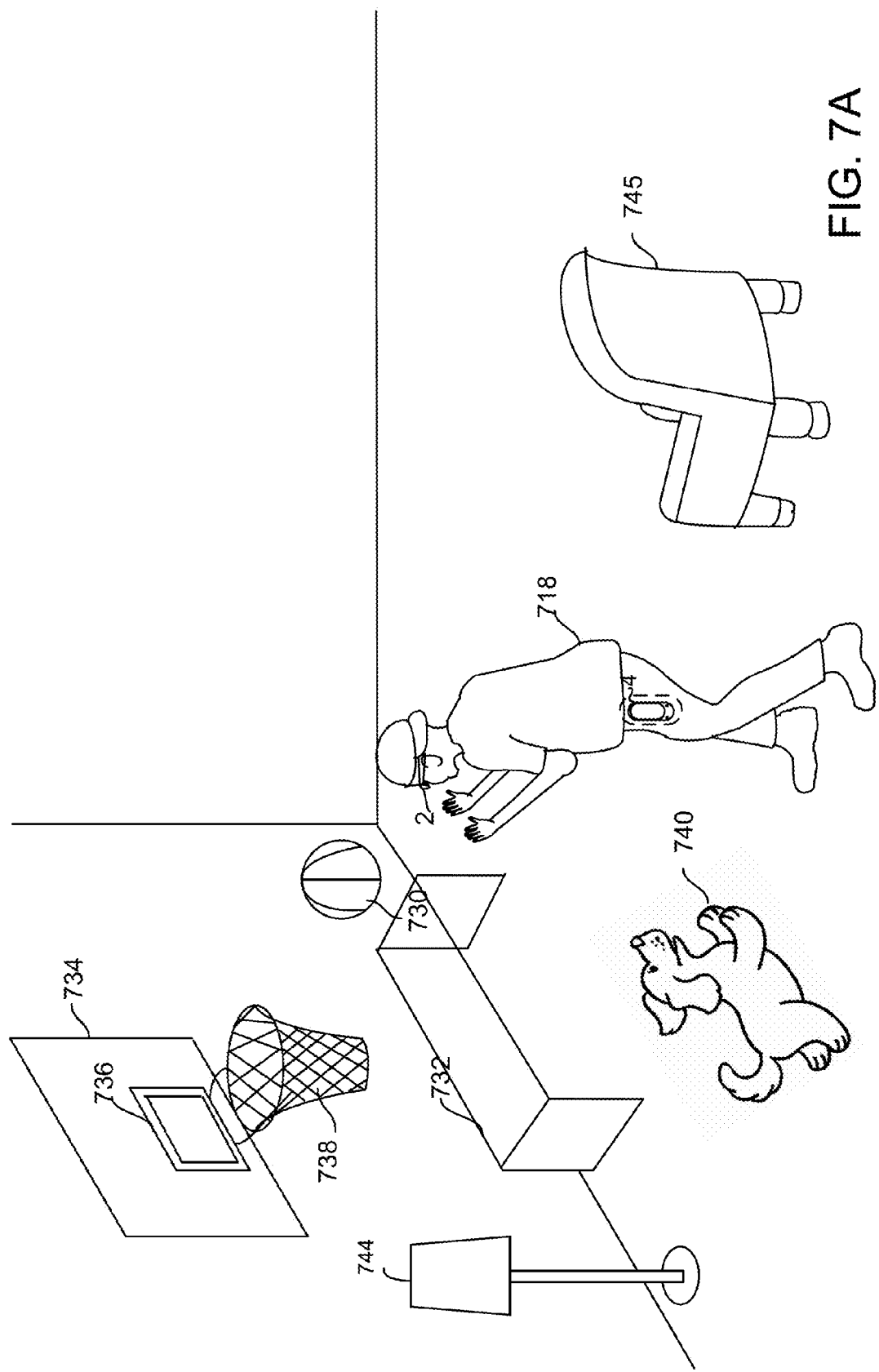

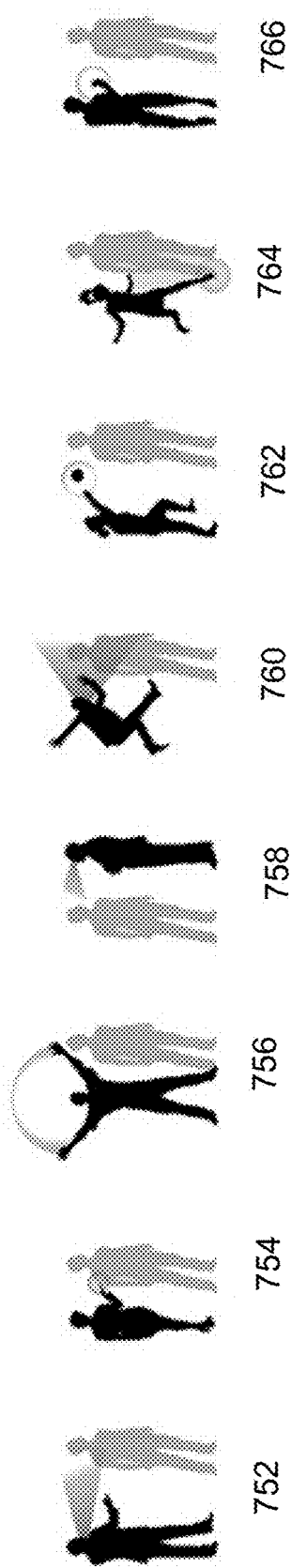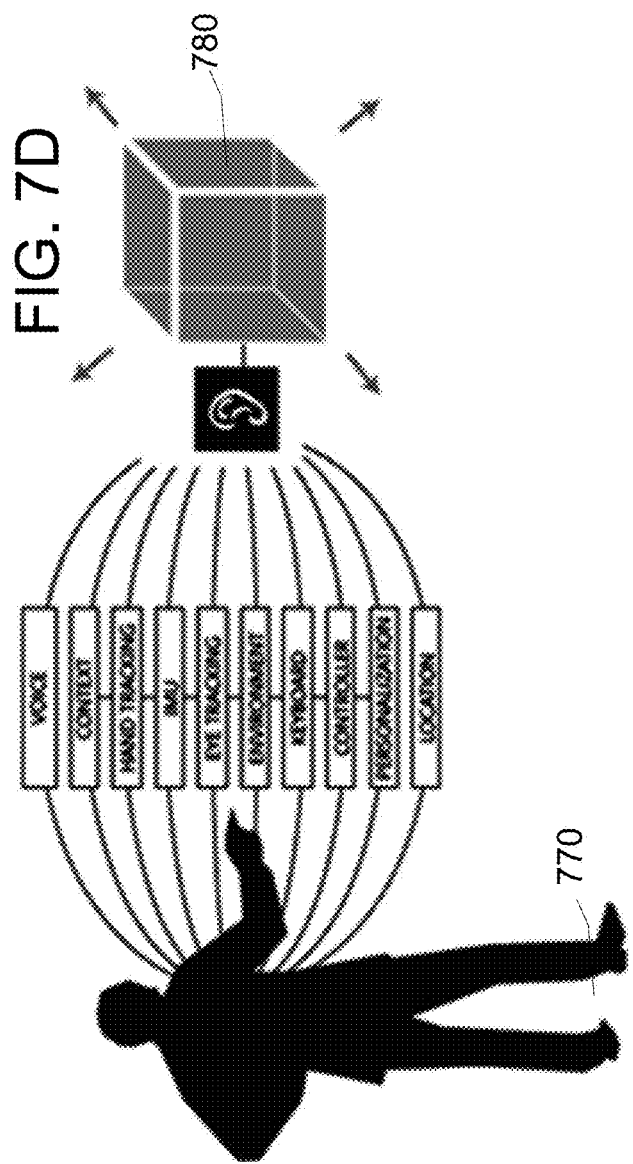
FIG. 7C
FIG. 7D

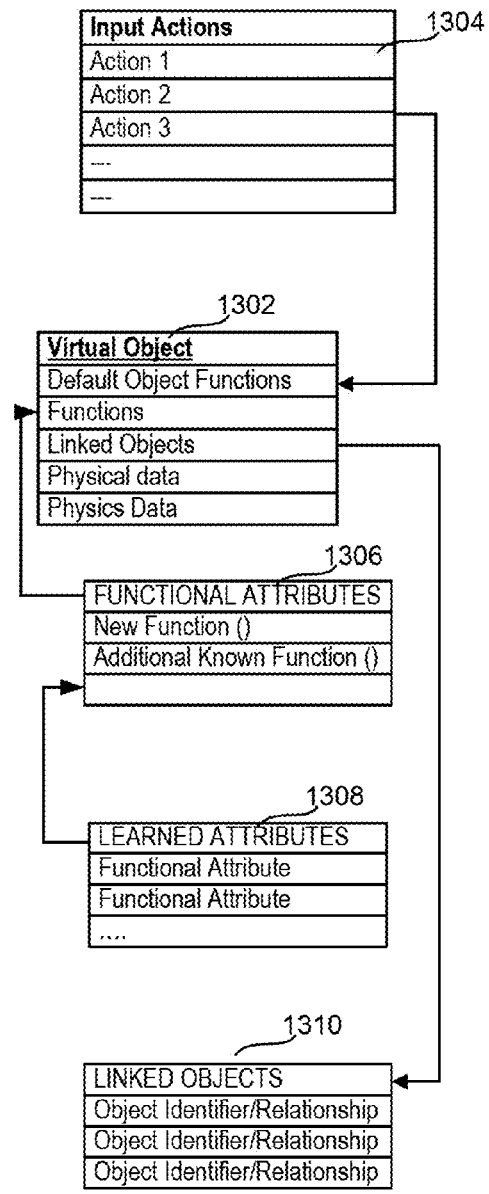
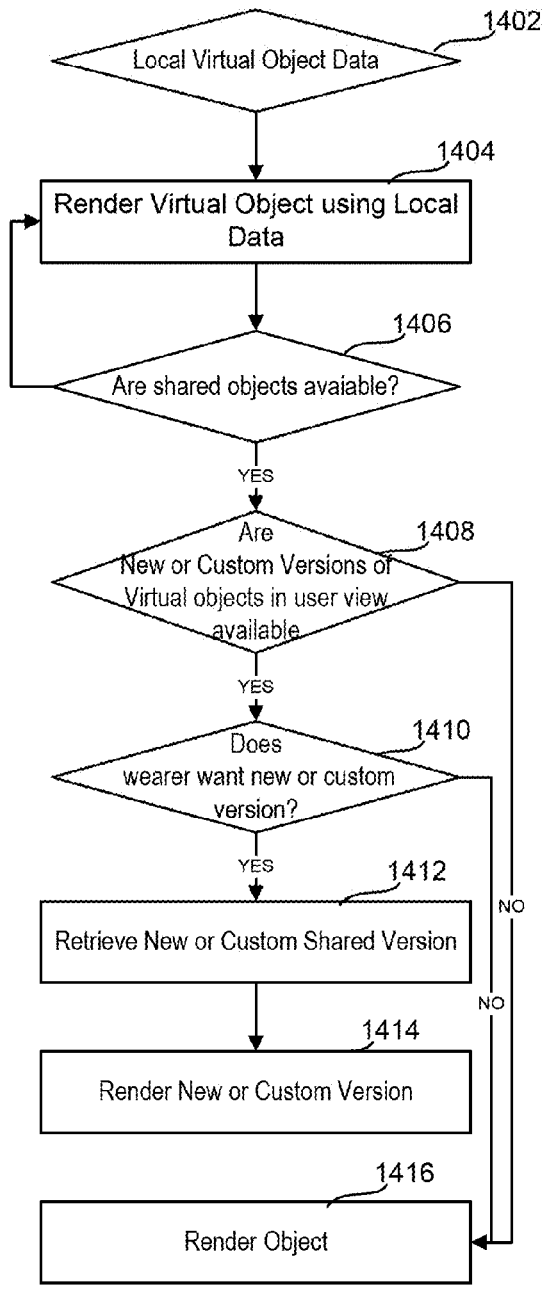
FIG. 13
FIG. 14

MIXED REALITY SYSTEM LEARNED INPUT AND FUNCTIONS

BACKGROUND

Mixed reality is a technology that allows virtual imagery to be mixed with a real world physical environment. Some mixed reality systems superimpose virtual images on real world images in real time through, for example, taking input from a camera and outputting the image and projecting a virtual image on the real world image. The superimposed virtual image does not generally react to any direct input to the virtual image by a user.

SUMMARY

Technology is described herein which provides various embodiments for implementing a mixed reality environment. Virtual objects provided with one or more default can gain new functionality and responsiveness based on natural user interactions with real and virtual objects in the user environment. The technology uses a variety of sensors to interpret various types of input actions from a user and learn new input actions and new object functions. With the plurality of input types provided by the device, user actions relative to the virtual objects and other users can be linked to create natural states of input which result in functions of objects.

In one context, a method of interpreting commands to a mixed reality environment includes rendering one or more virtual objects within a field of view and receiving input actions with the virtual objects in the field of view. The technology monitors input actions for: known input actions enabling known functions of virtual objects; unknown input actions for which known functions of virtual objects be enabled; known input actions for which unknown functions of a virtual object may be enabled; and unknown input actions for which unknown function of a virtual object may be enabled. When an unknown input action is detected, or a new function is detected, the new input action and new function can be created and used relative to virtual objects. These new input actions and new functions can be shared with others.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1A is a block diagram depicting example components of one embodiment of a see-through, mixed reality display device with adjustable IPD in a system environment in which the device may operate.

FIG. 2A is a top view illustrating examples of gaze vectors extending to a point of gaze at a distance and a direction for aligning a far IPD.

FIG. 3A is a flowchart of a method embodiment for aligning a see-through, near-eye, mixed reality display with an IPD.

FIG. 3B is a flowchart of an implementation example of a method for adjusting a display device for bringing the device into alignment with a user IPD.

FIG. 3C is a flowchart illustrating different example options of mechanical or automatic adjustment of at least one display adjustment mechanism.

FIG. 4A is a side view of an eyeglass temple in an eyeglasses embodiment of a mixed reality display device providing support for hardware and software components.

FIG. 4B is a side view of an eyeglass temple in an embodiment of a mixed reality display device providing support for hardware and software components and three dimensional adjustment of a microdisplay assembly.

FIG. 5A is a top view of an embodiment of a movable display optical system of a see-through, near-eye, mixed reality device including an arrangement of gaze detection elements.

FIG. 5B is a top view of another embodiment of a movable display optical system of a see-through, near-eye, mixed reality device including an arrangement of gaze detection elements.

FIG. 5C is a top view of a third embodiment of a movable display optical system of a see-through, near-eye, mixed reality device including an arrangement of gaze detection elements.

FIG. 5D is a top view of a fourth embodiment of a movable display optical system of a see-through, near-eye, mixed reality device including an arrangement of gaze detection elements.

FIG. 7A is a depiction of an environment with real and virtual objects.

FIG. 7C is an illustration of different types of user input to achieve the same task.

FIG. 7D is an illustration of the types of input which may be provided for a virtual object.

FIG. 13 is a diagram of an object structure which can be used to describe a virtual object with a learned structure.

FIG. 14 is a flowchart illustrating using shared objects of other users.

DETAILED DESCRIPTION

Figure 1B:
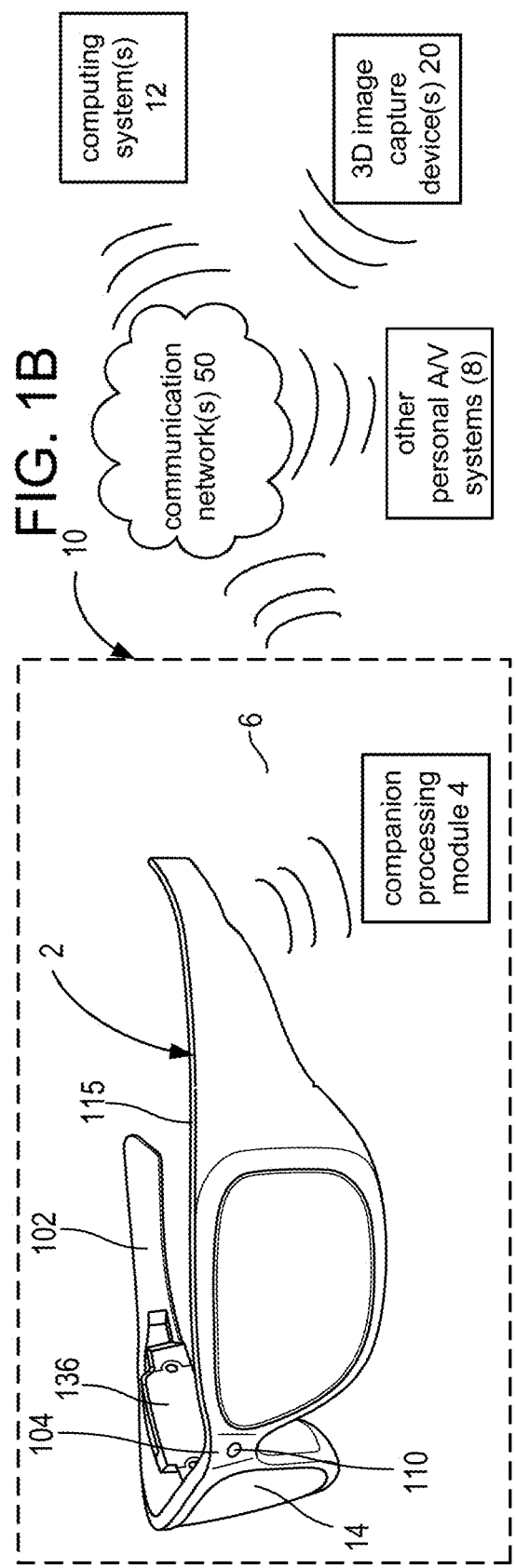
FIG. 1B is a block diagram depicting example components of another embodiment of a see-through, mixed reality display device with adjustable IPD.

The technology described herein includes a see-through, near-eye, mixed reality display device providing a mixed reality environment wherein one or more virtual objects and one or more real objects exist within the view of the device. A plurality of input sensors allow natural input actions of a user to control functions of virtual objects. Virtual objects may be provided with one or more default functions (including a physical state, actions and responses) to various types of input actions from a user of the device. New input actions and new object functions can be learned by the system in conjunction with actions and responses made by a user wearing the device.

With the plurality of input types provided by the device, user actions relative to the virtual objects and other users can be linked to create natural states of input which result in functions of objects. These natural actions result in a more natural user interface for interaction with the mixed reality environment.

Interactions with virtual objects can be learned by the display system by monitoring a multitude of inputs to determine and link input actions by a user to functions and responses of a virtual object. Each virtual object may be rendered through an understanding of a description of the object used by the display device to render the object and interactions between the object and other real and virtual objects. In order to learn new functions and inputs, the description of the object may be modified to reflect the new inputs and functions. In order to make the interaction with the objects as natural for humans as possible, a multitude of inputs may be used to provide input data creating the input actions which drive the functions of a virtual object.

FIG. 1A is a block diagram depicting example components of one embodiment of a see-through, mixed reality display device in a system environment in which the device may operate. In one embodiment, the technology implements a see through, near-eye display device. In other embodiments, see through display devices of different types may be used. System 10 includes a see-through display device as a near-eye, head mounted display device 2 in communication with processing unit 4 via wire 6. In other embodiments, head mounted display device 2 communicates with processing unit 4 via wireless communication. Processing unit 4 may take various embodiments. In some embodiments, processing unit 4 is a separate unit which may be worn on the user's body, e.g. the wrist in the illustrated example or in a pocket, and includes much of the computing power used to operate near-eye display device 2. Processing unit 4 may communicate wirelessly (e.g., WiFi, Bluetooth, infra-red, or other wireless communication means) to one or more computing systems, hot spots, cellular data networks, etc. In other embodiments, the functionality of the processing unit 4 may be integrated in software and hardware components of the display device 2.

See through head mounted display device 2, which in one embodiment is in the shape of eyeglasses in a frame 115, is worn on the head of a user so that the user can see through a display, embodied in this example as a display optical system 14 for each eye, and thereby have an actual direct view of the space in front of the user. The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Based on the context of executing software, for example, a gaming application, the system can project images of virtual objects, sometimes referred to as virtual images or holograms, on the display that are viewable by the person wearing the see-through display device while that person is also viewing real world objects through the display.

Frame 115 provides a support for holding elements of the system in place as well as a conduit for electrical connections. In this embodiment, frame 115 provides a convenient eyeglass frame as support for the elements of the system discussed further below. In other embodiments, other support structures can be used. An example of such a structure is a visor, hat, helmet or goggles. The frame 115 includes a temple or side arm for resting on each of a user's ears. Temple 102 is representative of an embodiment of the right temple and includes control circuitry 136 for the display device 2. Nose bridge 104 of the frame includes a microphone 110 for recording sounds and transmitting audio data to processing unit 4.

FIG. 1B is a block diagram depicting example components of another embodiment of a see-through, mixed reality display device. In some embodiments, processing unit 4 is a separate unit which may be worn on the user's body, e.g. a wrist, or be a separate device like a mobile device (e.g. smartphone). The processing unit 4 may communicate wired or wirelessly (e.g., WiFi, Bluetooth, infrared, RFID transmission, wireless Universal Serial Bus (USB), cellular, 3G, 4G or other wireless communication means) over a communication network 50 to one or more computing systems 12 whether located nearby or at a remote location. In other embodiments, the functionality of the processing unit 4 may be integrated in software and hardware components of the display device 2.

Figure 16:
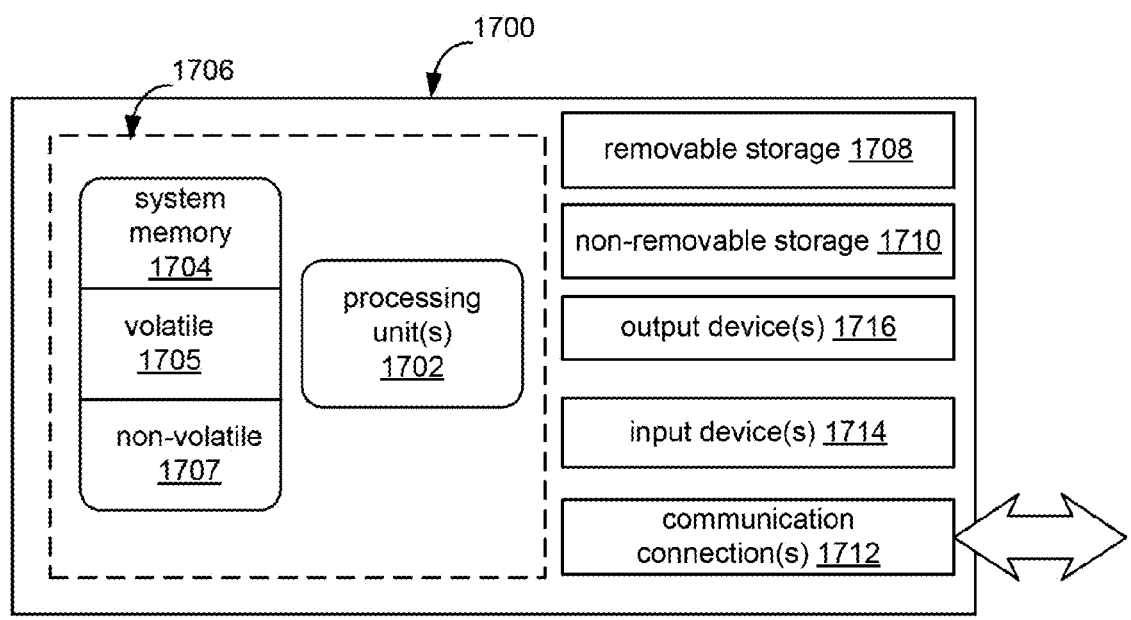
FIG. 16 is a block diagram of another exemplary processing device.

One or more remote, network accessible computer system(s) 12 may be leveraged for processing power and remote data access. An example of hardware components of a computing system 12 is shown in FIG. 16. An application may be executing on computing system 12 which interacts with or performs processing for an application executing on one or more processors in the see-through, augmented reality display system 10. For example, a 3D mapping application may be executing on the one or more computer systems 12 and the user's display system 10.

Additionally, in some embodiments, the applications executing on other see through head mounted display systems 10 in same environment or in communication with each other share data updates in real time, for example object identifications and occlusion data like an occlusion volume for a real object, in a peer-to-peer configuration between devices or to object management service executing in one or more network accessible computing systems.

The shared data in some examples may be referenced with respect to one or more referenced coordinate systems accessible to the device 2. In other examples, one head mounted display (HMD) device may receive data from another HMD device including image data or data derived from image data, position data for the sending HMD, e.g. GPS or IR data giving a relative position, and orientation data. An example of data shared between the HMDs is depth map data including image data and depth data captured by its front facing cameras 113, object identification data, and occlusion volumes for real objects in the depth map. The real objects may still be unidentified or have been recognized by software executing on the HMD device or a supporting computer system, e.g. 12 or another display system 10.

An example of an environment is a 360 degree visible portion of a real location in which the user is situated. A user may be looking at a subset of his environment which is his field of view. For example, a room is an environment. A person may be in a house and be in the kitchen looking at the top shelf of the refrigerator. The top shelf of the refrigerator is within his display field of view, the kitchen is his environment, but his upstairs bedroom is not part of his current environment as walls and a ceiling block his view of the upstairs bedroom. Of course, as he moves, his environment changes. Some other examples of an environment may be a ball field, a street location, a section of a store, a customer section of a coffee shop and the like. A location can include multiple environments, for example, the house may be a location. The user and his friends may be wearing their display device systems for playing a game which takes place throughout the house. As each player moves about the house, his environment changes. Similarly, a perimeter around several blocks may be a location and different intersections provide different environments to view as different cross streets come into view. In some instances, a location can also be an environment depending on the precision of location tracking sensors or data.

FIG. 2A is a top view illustrating examples of gaze vectors extending to a point of gaze at a distance and direction for aligning a far inter-pupillary distance (IPD). FIG. 2A illustrates examples of gaze vectors intersecting at a point of gaze where a user's eyes are focused effectively at infinity, for example beyond five (5) feet, or, in other words, examples of gaze vectors when the user is looking straight ahead. A model of the eyeball 160*l*, 160*r* is illustrated for each eye based on the Gullstrand schematic eye model. For each eye, an eyeball 160 is modeled as a sphere with a center 166 of rotation and includes a cornea 168 modeled as a sphere too and having a center 164. The cornea rotates with the eyeball, and the center 166 of rotation of the eyeball may be treated as a fixed point. The cornea covers an iris 170 with a pupil 162 at its center. In this example, on the surface 172 of the respective cornea are glints 174 and 176.

In the illustrated embodiment of FIG. 2A, a sensor detection area 139 (139*l* and 139*r*) is aligned with the optical axis of each display optical system 14 within an eyeglass frame 115. The sensor associated with the detection area is a camera in this example capable of capturing image data representing glints 174*l* and 176*l* generated respectively by illuminators 153*a* and 153*b* on the left side of the frame 115 and data representing glints 174*r* and 176*r* generated respectively by illuminators 153*c* and 153*d*. Through the display optical systems, 14*l* and 14*r* in the eyeglass frame 115, the user's field of view includes both real objects 190, 192 and 194 and virtual objects 182, 184, and 186.

The axis 178 formed from the center 166 of rotation through the cornea center 164 to the pupil 162 is the optical axis of the eye. A gaze vector 180 is sometimes referred to as the line of sight or visual axis which extends from the fovea through the center of the pupil 162. The fovea is a small area of about 1.2 degrees located in the retina. The angular offset between the optical axis computed and the visual axis has horizontal and vertical components. The horizontal component is up to 5 degrees from the optical axis, and the vertical component is between 2 and 3 degrees. In many embodiments, the optical axis is determined and a small correction is determined through user calibration to obtain the visual axis which is selected as the gaze vector.

For each user, a virtual object may be displayed by the display device at each of a number of predetermined positions at different horizontal and vertical positions. An optical axis may be computed for each eye during display of the object at each position, and a ray modeled as extending from the position into the user eye. A gaze offset angle with horizontal and vertical components may be determined based on how the optical axis is to be moved to align with the modeled ray. From the different positions, an average gaze offset angle with horizontal or vertical components can be selected as the small correction to be applied to each computed optical axis. In some embodiments, a horizontal component is used for the gaze offset angle correction.

The gaze vectors 180*l* and 180*r* are not perfectly parallel as the vectors become closer together as they extend from the eyeball into the field of view at a point of gaze which is effectively at infinity as indicated by the symbols 181*l* and 181*r*. At each display optical system 14, the gaze vector 180 appears to intersect the optical axis upon which the sensor detection area 139 is centered. In this configuration, the optical axes are aligned with the inter-pupillary distance (IPD). When a user is looking straight ahead, the IPD measured is also referred to as the far IPD.

When identifying an object for a user to focus on for aligning IPD at a distance, the object may be aligned in a direction along each optical axis of each display optical system. Initially, the alignment between the optical axis and user's pupil is not known. For a far IPD, the direction may be straight ahead through the optical axis. When aligning near IPD, the identified object may be in a direction through the optical axis, however due to vergence of the eyes at close distances, the direction is not straight ahead although it may be centered between the optical axes of the display optical systems.

Figure 2B:
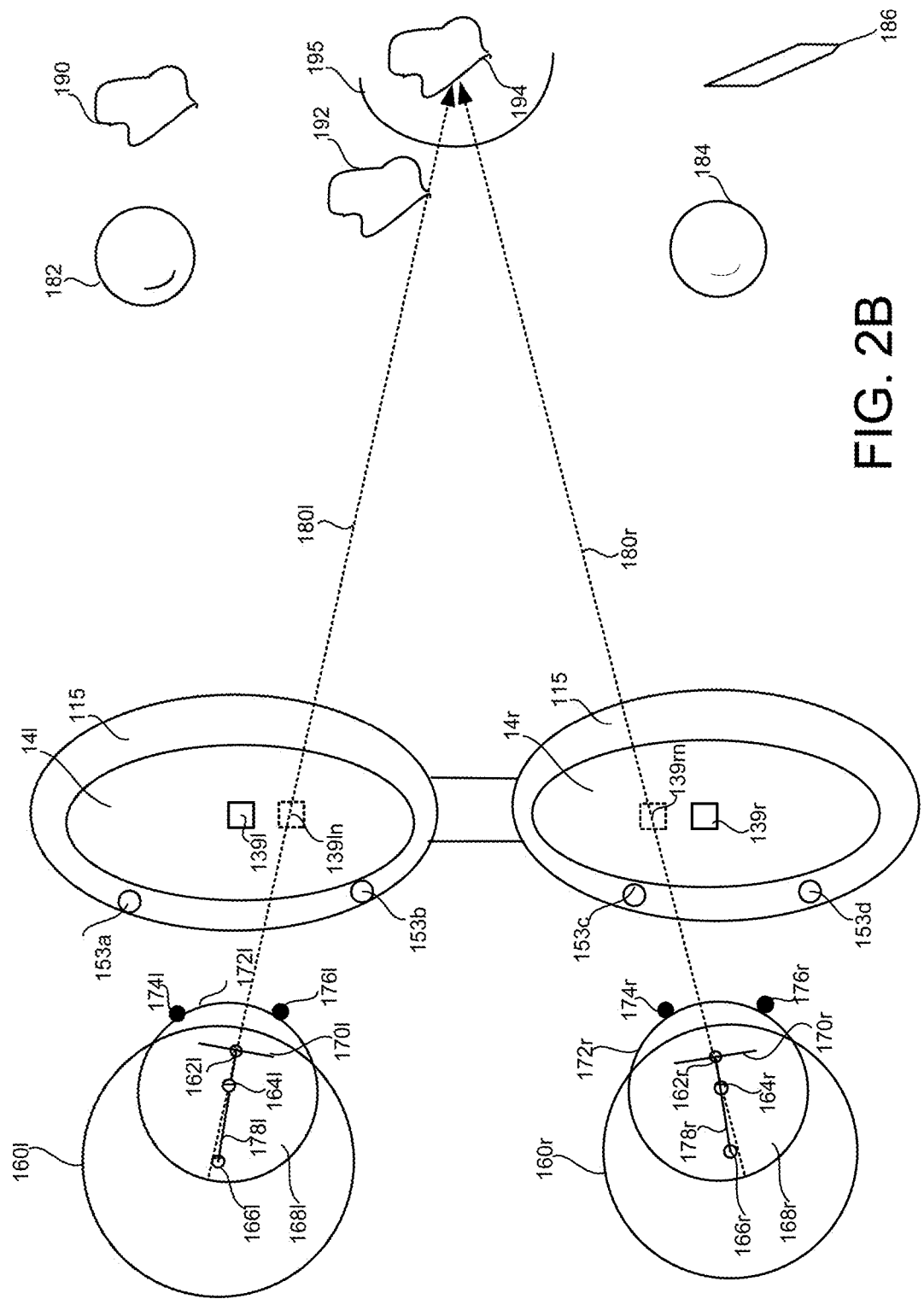
FIG. 2B is a top view illustrating examples of gaze vectors extending to a point of gaze at a distance and a direction for aligning a near IPD.

FIG. 2B is a top view illustrating examples of gaze vectors extending to a point of gaze at a distance and a direction for aligning a near IPD. In this example, the cornea 168*l* of the left eye is rotated to the right or towards the user's nose, and the cornea 168*r* of the right eye is rotated to the left or towards the user's nose. Both pupils are gazing at a real object 194 at a much closer distance, for example two (2) feet in front of the user. Gaze vectors 180*l* and 180*r* from each eye enter the Panum's fusional region 195 in which real object 194 is located. The Panum's fusional region is the area of single vision in a binocular viewing system like that of human vision. The intersection of the gaze vectors 180*l* and 180*r* indicates that the user is looking at real object 194. At such a distance, as the eyeballs rotate inward, the distance between their pupils decreases to a near IPD. The near IPD is typically about 4 mm less than the far IPD. A near IPD distance criteria, e.g. a point of gaze at less than four feet for example, may be used to switch or adjust the IPD alignment of the display optical systems 14 to that of the near IPD. For the near IPD, each display optical system 14 may be moved toward the user's nose so the optical axis, and detection area 139, moves toward the nose a few millimeters as represented by detection areas 139*ln* and 139*rn*.

Techniques for automatically determining a user's IPD and automatically adjusting the STHMD to set the IPD for optimal user viewing, are discussed in co-pending U.S. patent application Ser. No. 13/221,739 entitled "Gaze Detection In A See-Through, Near-Eye, Mixed Reality Display"; U.S. patent application Ser. No. 13/221,707 entitled "Adjustment Of A Mixed Reality Display For Inter-Pupillary Distance Alignment"; and U.S. patent application Ser. No. 13/221,662 entitled "Aligning Inter-Pupillary Distance In A Near-Eye Display System", all of which are hereby incorporated specifically by reference.

In general, FIG. 3A shows is a flowchart of a method embodiment 300 for aligning a see-through, near-eye, mixed reality display with an IPD. In step 301, one or more processors of the control circuitry 136, automatically determines whether a see-through, near-eye, mixed reality display device is aligned with an IPD of a user in accordance with an alignment criteria. If not, in step 302a, the one or more processors cause adjustment of the display device by at least one display adjustment mechanism for bringing the device into alignment with the user IPD. If it is determined the see-through, near-eye, mixed reality display device is in alignment with a user IPD, optionally, in step 303 an IPD data set is stored for the user. In some embodiments, a display device 2 may automatically determine whether there is IPD alignment each time anyone puts on the display device 2. However, as IPD data is generally fixed for adults, due to the confines of the human skull, an IPD data set may be determined typically once and stored for each user. The stored IPD data set may at least be used as an initial setting for a display device with which to begin an IPD alignment check.

FIG. 3B is a flowchart of an implementation example of a method for adjusting a display device for bringing the device into alignment with a user IPD. In this method, at least one display adjustment mechanism adjusts the position of a at least one display optical system 14 which is misaligned. In step 407, one or more adjustment are automatically determined for the at least one display adjustment mechanism for satisfying the alignment criteria for at least one display optical system. In step 408, that at least one display optical system is adjusted based on the one or more adjustment values. The adjustment may be performed automatically under the control of a processor or mechanically as discussed further below.

FIG. 3C is a flowchart illustrating different example options of mechanical or automatic adjustment by the at least one display adjustment mechanism as may be used to implement step 408. Depending on the configuration of the display adjustment mechanism in the display device 2, from step 407 in which the one or more adjustment values were already determined, the display adjustment mechanism may either automatically, meaning under the control of a processor, adjust the at least one display adjustment mechanism in accordance with the one or more adjustment values in step 334. Alternatively, one or more processors associated with the system may electronically provide instructions as per step 333 for user application of the one or more adjustment values to the at least one display adjustment mechanism. There may be instances of a combination of automatic and mechanical adjustment under instructions.

Some examples of electronically provided instructions are instructions displayed by the microdisplay 120, the processing unit 4 or audio instructions through speakers 130 of the display device 2. There may be device configurations with an automatic adjustment and a mechanical mechanism depending on user preference or for allowing a user some additional control.

FIG. 4A illustrates an exemplary arrangement of a see through, near-eye, mixed reality display device embodied as eyeglasses with movable display optical systems including gaze detection elements. What appears as a lens for each eye represents a display optical system 14 for each eye, e.g. 14r and 14l. A display optical system includes a see-through lens, e.g. 118 and 116 in FIGS. 5A-5b, as in an ordinary pair of glasses, but also contains optical elements (e.g. mirrors, filters) for seamlessly fusing virtual content with the actual direct real world view seen through the lenses 118, 116. A display optical system 14 has an optical axis which is generally in the center of the see-through lens 118, 116 in which light is generally collimated to provide a distortionless view. For example, when an eye care professional fits an ordinary pair of eyeglasses to a user's face, a goal is that the glasses sit on the user's nose at a position where each pupil is aligned with the center or optical axis of the respective lens resulting in generally collimated light reaching the user's eye for a clear or distortionless view.

In an exemplary display device 2, a detection area of at least one sensor is aligned with the optical axis of its respective display optical system so that the center of the detection area is capturing light along the optical axis. If the display optical system is aligned with the user's pupil, each detection area of the respective sensor is aligned with the user's pupil. Reflected light of the detection area is transferred via one or more optical elements to the actual image sensor of the camera in this example illustrated by dashed line as being inside the frame 115.

In one example, a visible light camera (also commonly referred to as an RGB camera) may be the sensor. An example of an optical element or light directing element is a visible light reflecting mirror which is partially transmissive and partially reflective. The visible light camera provides image data of the pupil of the user's eye, while IR photodetectors 152 capture glints which are reflections in the IR portion of the spectrum. If a visible light camera is used, reflections of virtual images may appear in the eye data captured by the camera. An image filtering technique may be used to remove the virtual image reflections if desired. An IR camera is not sensitive to the virtual image reflections on the eye.

In other examples, the at least one sensor is an IR camera or a position sensitive detector (PSD) to which the IR radiation may be directed. For example, a hot reflecting surface may transmit visible light but reflect IR radiation. The IR radiation reflected from the eye may be from incident radiation of illuminators, other IR illuminators (not shown) or from ambient IR radiation reflected off the eye. In some examples, sensor may be a combination of an RGB and an IR camera, and the light directing elements may include a visible light reflecting or diverting element and an IR radiation reflecting or diverting element. In some examples, a camera may be small, e.g. 2 millimeters (mm) by 2 mm.

Various types of gaze detection systems are suitable for use in the present system. In some embodiments which calculate a cornea center as part of determining a gaze vector, two glints, and therefore two illuminators will suffice. However, other embodiments may use additional glints in determining a pupil position and hence a gaze vector. As eye data representing the glints is repeatedly captured, for example at 30 frames a second or greater, data for one glint may be blocked by an eyelid or even an eyelash, but data may be gathered by a glint generated by another illuminator.

FIG. 4A is a side view of an eyeglass temple 102 of the frame 115 in an eyeglasses embodiment of a see-through, mixed reality display device. At the front of frame 115 is physical environment facing video camera 113 that can capture video and still images. Particularly in some embodiments, physical environment facing camera 113 may be a depth camera as well as a visible light or RGB camera. For example, the depth camera may include an IR illuminator transmitter and a hot reflecting surface like a hot mirror in front of the visible image sensor which lets the visible light pass and directs reflected IR radiation within a wavelength range or about a predetermined wavelength transmitted by the illuminator to a CCD or other type of depth sensor. Other types of visible light camera (RGB camera) and depth cameras can be used. More information about depth cameras can be found in U.S. patent application Ser. No. 12/813,675, filed on Jun. 11, 2010, entitled "MULTI-MODAL GENDER RECOGNITION" incorporated herein by reference in its entirety. The data from the sensors may be sent to a processor 210 of the control circuitry 136, or the processing unit 4 or both which may process them but which the unit 4 may also send to a computer system over a network or secondary computing system for processing. The processing identifies objects through image segmentation and edge detection techniques and maps depth to the objects in the user's real world field of view. Additionally, the physical environment facing camera 113 may also include a light meter for measuring ambient light.

Control circuitry 136 provide various electronics that support the other components of head mounted display device 2. More details of control circuitry 136 are provided below with respect to FIGS. 6A and 6B. Inside, or mounted to temple 102, are ear phones 130, inertial sensors 132, GPS transceiver 144 and temperature sensor 138. In one embodiment inertial sensors 132 include a three axis magnetometer 132A, three axis gyro 132B and three axis accelerometer 132C (See FIG. 7A). The inertial sensors are for sensing position, orientation, and sudden accelerations of head mounted display device 2. From these movements, head position may also be determined.

The display device 2 provides an image generation unit which can create one or more images including one or more virtual objects. In some embodiments a microdisplay may be used as the image generation unit. A microdisplay assembly 173 in this example comprises light processing elements and a variable focus adjuster 135. An example of a light processing element is a microdisplay 120. Other examples include one or more optical elements such as one or more lenses of a lens system 122 and one or more reflecting elements such as reflective elements 124a and 124b in FIGS. 6A and 6B or 124 in FIGS. 6C and 6D. Lens system 122 may comprise a single lens or a plurality of lenses.

Mounted to or inside temple 102, the microdisplay 120 includes an image source and generates an image of a virtual object. The microdisplay 120 is optically aligned with the lens system 122 and the reflecting element 124 or reflecting elements 124a and 124b as illustrated in the following Figures. The optical alignment may be along an optical path 133 including one or more optical axes. The microdisplay 120 projects the image of the virtual object through lens system 122, which may direct the image light, onto reflecting element 124 which directs the light into lightguide optical element 112 as in FIGS. 5C and 5D or onto reflecting element 124a (e.g. a mirror or other surface) which directs the light of the virtual image to a partially reflecting element 124b which combines the virtual image view along path 133 with the natural or actual direct view along the optical axis 142 as in FIGS. 5A-5D. The combination of views are directed into a user's eye.

The variable focus adjuster 135 changes the displacement between one or more light processing elements in the optical path of the microdisplay assembly or an optical power of an element in the microdisplay assembly. The optical power of a lens is defined as the reciprocal of its focal length, e.g. 1/focal length, so a change in one effects the other. The change in focal length results in a change in the region of the field of view, e.g. a region at a certain distance, which is in focus for an image generated by the microdisplay assembly 173.

In one example of the microdisplay assembly 173 making displacement changes, the displacement changes are guided within an armature 137 supporting at least one light processing element such as the lens system 122 and the microdisplay 120 in this example. The armature 137 helps stabilize the alignment along the optical path 133 during physical movement of the elements to achieve a selected displacement or optical power. In some examples, the adjuster 135 may move one or more optical elements such as a lens in lens system 122 within the armature 137. In other examples, the armature may have grooves or space in the area around a light processing element so it slides over the element, for example, microdisplay 120, without moving the light processing element. Another element in the armature such as the lens system 122 is attached so that the system 122 or a lens within slides or moves with the moving armature 137. The displacement range is typically on the order of a few millimeters (mm). In one example, the range is 1-2 mm. In other examples, the armature 137 may provide support to the lens system 122 for focal adjustment techniques involving adjustment of other physical parameters than displacement. An example of such a parameter is polarization.

For more information on adjusting a focal distance of a microdisplay assembly, see U.S. patent Ser. No. 12/941,825 entitled "Automatic Variable Virtual Focus for Augmented Reality Displays," filed Nov. 8, 2010, having inventors Avi Bar-Zeev and John Lewis and which is hereby incorporated by reference.

In one example, the adjuster 135 may be an actuator such as a piezoelectric motor. Other technologies for the actuator may also be used and some examples of such technologies are a voice coil formed of a coil and a permanent magnet, a magnetostriction element, and an electrostriction element.

There are different image generation technologies that can be used to implement microdisplay 120. For example, microdisplay 120 can be implemented using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and Mirasol® display technology from Qualcomm, Inc. are all examples of reflective technologies which are efficient as most energy is reflected away from the modulated structure and may be used in the system described herein. Additionally, microdisplay 120 can be implemented using an emissive technology where light is generated by the display. For example, a PicoP™ engine from Microvision, Inc. emits a laser signal with a micro mirror steering either onto a tiny screen that acts as a transmissive element or beamed directly into the eye (e.g., laser).

FIG. 4B is a side view of an eyeglass temple in another embodiment of a mixed reality display device providing support for hardware and software components and three dimensional adjustment of a microdisplay assembly. Some of the numerals illustrated in the FIG. 5A above have been removed to avoid clutter in the drawing. In embodiments where the display optical system 14 is moved in any of three dimensions, the optical elements represented by reflecting element 124 and the other elements of the microdisplay assembly 173, e.g. 120, 122 may also be moved for maintaining the optical path 133 of the light of a virtual image to the display optical system. An XYZ transport mechanism in this example made up of one or more motors represented by display adjustment mechanism 203 and shafts 205 under control of the processor 210 of control circuitry 136 (see FIG. 6A) control movement of the elements of the microdisplay assembly 173. An example of motors which may be used are piezoelectric motors. In the illustrated example, one motor is attached to the armature 137 and moves the variable focus adjuster 135 as well, and another display adjustment mechanism 203 controls the movement of the reflecting element 124.

FIG. 5A is a top view of an embodiment of a movable display optical system 14 of a see-through, near-eye, mixed reality display device 2 including an arrangement of gaze detection elements. A portion of the frame 115 of the near-eye display device 2 will surround a display optical system 14 and provides support for elements of an embodiment of a microdisplay assembly 173 including microdisplay 120 and its accompanying elements as illustrated. In order to show the components of the display system 14, in this case display optical system 14r for the right eye system, a top portion of the frame 115 surrounding the display optical system is not depicted. Additionally, the microphone 110 in bridge 104 is not shown in this view to focus attention on the operation of the display adjustment mechanism 203. As in the example of FIG. 4C, the display optical system 14 in this embodiment is moved by moving an inner frame 117r, which in this example surrounds the microdisplay assembly 173 as well. The display adjustment mechanism 203 is embodied in this embodiment provided as three axis motors which attach their shafts 205 to inner frame 117r to translate the display optical system 14, which in this embodiment includes the microdisplay assembly 173, in any of three dimensions as denoted by symbol 145 indicating three (3) axes of movement.

The display optical system 14 in this embodiment has an optical axis 142 and includes a see-through lens 118 allowing the user an actual direct view of the real world. In this example, the see-through lens 118 is a standard lens used in eye glasses and can be made to any prescription (including no prescription). In another embodiment, see-through lens 118 can be replaced by a variable prescription lens. In some embodiments, see-through, near-eye display device 2 will include additional lenses.

The display optical system 14 further comprises reflecting reflective elements 124a and 124b. In this embodiment, light from the microdisplay 120 is directed along optical path 133 via a reflecting element 124a to a partially reflective element 124b embedded in lens 118 which combines the virtual object image view traveling along optical path 133 with the natural or actual direct view along the optical axis 142 so that the combined views are directed into a user's eye, right one in this example, at the optical axis, the position with the most collimated light for a clearest view.

A detection area of a light sensor is also part of the display optical system 14r. An optical element 125 embodies the detection area by capturing reflected light from the user's eye received along the optical axis 142 and directs the captured light to the sensor 134r, in this example positioned in the lens 118 within the inner frame 117r. As shown, the arrangement allows the detection area 139 of the sensor 134r to have its center aligned with the center of the display optical system 14. For example, if sensor 134r is an image sensor, sensor 134r captures the detection area 139, so an image captured at the image sensor is centered on the optical axis because the detection area 139 is. In one example, sensor 134r is a visible light camera or a combination of RGB/IR camera, and the optical element 125 includes an optical element which reflects visible light reflected from the user's eye, for example a partially reflective mirror.

In other embodiments, the sensor 134r is an IR sensitive device such as an IR camera, and the element 125 includes a hot reflecting surface which lets visible light pass through it and reflects IR radiation to the sensor 134r. An IR camera may capture glints, but also an infra-red or near infra-red image of the user's eye including the pupil.

In other embodiments, the IR sensor 134r is a position sensitive device (PSD), sometimes referred to as an optical position sensor. The depiction of the light directing elements, in this case reflecting elements, 125, 124, 124a and 124b in FIGS. 5A-5D are representative of their functions. The elements may take any number of forms and be implemented with one or more optical components in one or more arrangements for directing light to its intended destination such as a camera sensor or a user's eye.

Figure 6A:
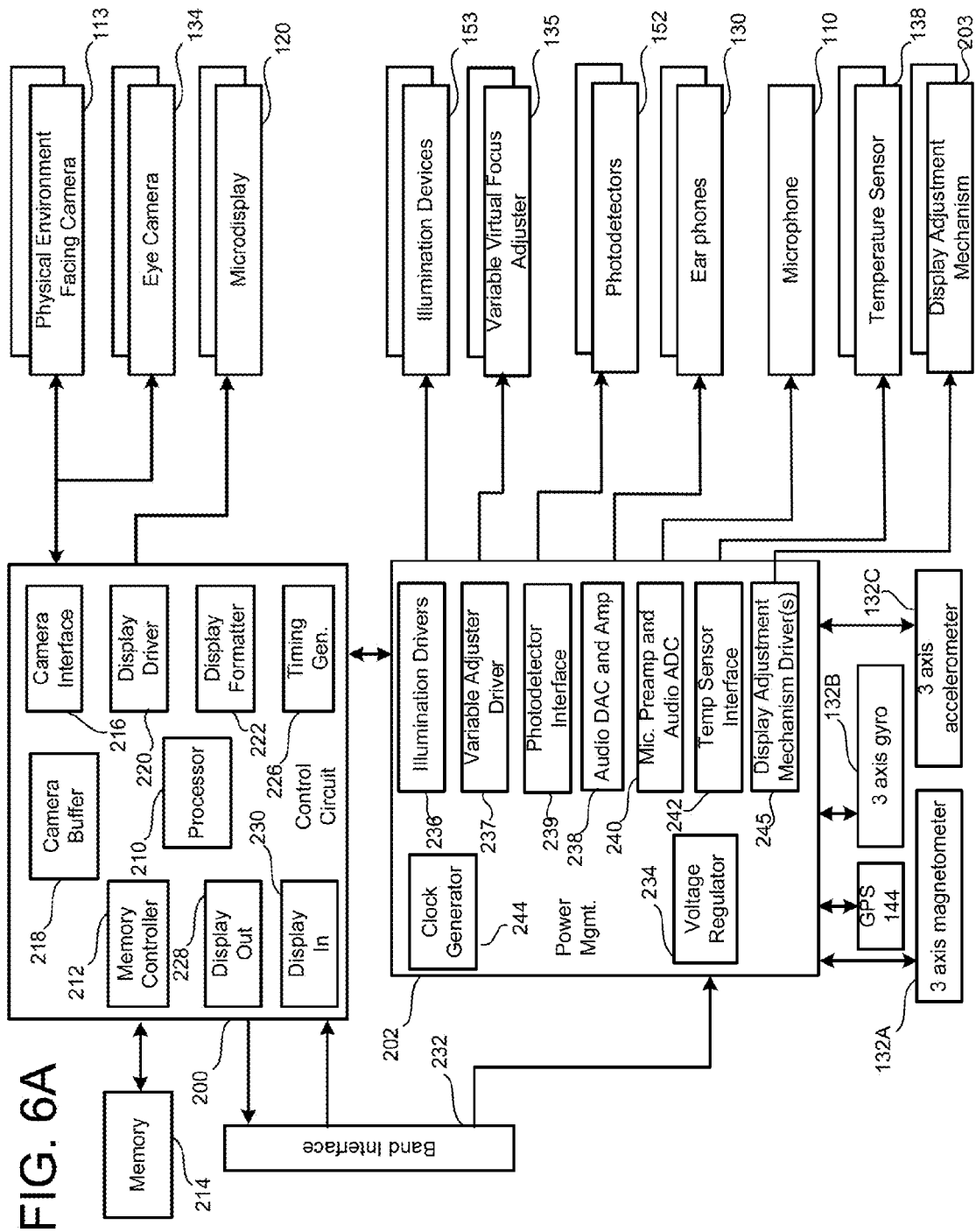
FIG. 6A is a block diagram of one embodiment of hardware and software components of a see-through, near-eye, mixed reality display unit as may be used with one or more embodiments.

As discussed in FIGS. 2A and 2B above and in the Figures below, when the user is looking straight ahead, and the center of the user's pupil is centered in an image captured of the user's eye when a detection area 139 or an image sensor 134r is effectively centered on the optical axis of the display, the display optical system 14r is aligned with the pupil. When both display optical systems 14 are aligned with their respective pupils, the distance between the optical centers matches or is aligned with the user's inter-pupillary distance. In the example of FIG. 6A, the inter-pupillary distance can be aligned with the display optical systems 14 in three dimensions.

In one embodiment, if the data captured by the sensor 134 indicates the pupil is not aligned with the optical axis, one or more processors in the processing unit 4 or the control circuitry 136 or both use a mapping criteria which correlates a distance or length measurement unit to a pixel or other discrete unit or area of the image for determining how far off the center of the pupil is from the optical axis 142. Based on the distance determined, the one or more processors determine adjustments of how much distance and in which direction the display optical system 14r is to be moved to align the optical axis 142 with the pupil. Control signals are applied by one or more display adjustment mechanism drivers 245 to each of the components, e.g. display adjustment mechanism 203, making up one or more display adjustment mechanisms 203. In the case of motors in this example, the motors move their shafts 205 to move the inner frame 117r in at least one direction indicated by the control signals. On the temple side of the inner frame 117r are flexible sections 215a, 215b of the frame 115 which are attached to the inner frame 117r at one end and slide within grooves 217a and 217b within the interior of the temple frame 115 to anchor the inner frame 117 to the frame 115 as the display optical system 14 is move in any of three directions for width, height or depth changes with respect to the respective pupil.

In addition to the sensor, the display optical system 14 includes other gaze detection elements. In this embodiment, attached to frame 117r on the sides of lens 118, are at least two (2) but may be more, infra-red (IR) illuminators 153 which direct narrow infra-red light beams within a particular wavelength range or about a predetermined wavelength at the user's eye to each generate a respective glint on a surface of the respective cornea. In other embodiments, the illuminators and any photodiodes may be on the lenses, for example at the corners or edges. In this embodiment, in addition to the at least 2 infra-red (IR) illuminators 153 are IR photodetectors 152. Each photodetector 152 is sensitive to IR radiation within the particular wavelength range of its corresponding IR illuminator 153 across the lens 118 and is positioned to detect a respective glint. As shown in FIGS. 4A-4C, the illuminator and photodetector are separated by a barrier 154 so that incident IR light from the illuminator 153 does not interfere with reflected IR light being received at the photodetector 152. In the case where the sensor 134 is an IR sensor, the photodetectors 152 may not be needed or may be an additional glint data capture source. With a visible light camera, the photodetectors 152 capture light from glints and generate glint intensity values.

In FIGS. 5A-5D, the positions of the gaze detection elements, e.g. the detection area 139 and the illuminators 153 and photodetectors 152 are fixed with respect to the optical axis of the display optical system 14. These elements may move with the display optical system 14r, and hence its optical axis, on the inner frame, but their spatial relationship to the optical axis 142 does not change.

FIG. 5B is a top view of another embodiment of a movable display optical system of a see-through, near-eye, mixed reality device including an arrangement of gaze detection elements. In this embodiment, light sensor 134r may be embodied as a visible light camera, sometimes referred to as an RGB camera, or it may be embodied as an IR camera or a camera capable of processing light in both the visible and IR ranges, e.g. a depth camera. In this example, the image sensor 134r is the detection area 139r. The image sensor 134 of the camera is located vertically on the optical axis 142 of the display optical system. In some examples, the camera may be located on frame 115 either above or below see-through lens 118 or embedded in the lens 118. In some embodiments, the illuminators 153 provide light for the camera, and in other embodiments the camera captures images with ambient lighting or light from its own light source. Image data captured may be used to determine alignment of the pupil with the optical axis. Gaze determination techniques based on image data, glint data or both may be used based on the geometry of the gaze detection elements.

In this example, the display adjustment mechanism 203 in bridge 104 moves the display optical system 14r in a horizontal direction with respect to the user's eye as indicated by directional symbol 145. The flexible frame portions 215a and 215b slide within grooves 217a and 217b as the system 14 is moved. In this example, reflecting element 124a of an microdisplay assembly 173 embodiment is stationery. As the IPD is typically determined once and stored, any adjustment of the focal length between the microdisplay 120 and the reflecting element 124a that may be done may be accomplished by the microdisplay assembly, for example via adjustment of the microdisplay elements within the armature 137.

FIG. 5C is a top view of a third embodiment of a movable display optical system of a see-through, near-eye, mixed reality device including an arrangement of gaze detection elements. The display optical system 14 has a similar arrangement of gaze detection elements including IR illuminators 153 and photodetectors 152, and a light sensor 134r located on the frame 115 or lens 118 below or above optical axis 142. In this example, the display optical system 14 includes a light guide optical element 112 as the reflective element for directing the images into the user's eye and is situated between an additional see-through lens 116 and see-through lens 118. As reflecting element 124 is within the lightguide optical element and moves with the element 112, an embodiment of a microdisplay assembly 173 is attached on the temple 102 in this example to a display adjustment mechanism 203 for the display optical system 14 embodied as a set of three axis mechanism 203 with shafts 205 include at least one for moving the microdisplay assembly. One or more display adjustment mechanism 203 on the bridge 104 are representative of the other components of the display adjustment mechanism 203 which provides three axes of movement. In another embodiment, the display adjustment mechanism may operate to move the devices via their attached shafts 205 in the horizontal direction. The mechanism 203 for the microdisplay assembly 173 may also move it horizontally for maintaining alignment between the light coming out of the microdisplay 120 and the reflecting element 124. A processor 210 of the control circuitry (see FIG. 7A) coordinates their movement.

Lightguide optical element 112 transmits light from microdisplay 120 to the eye of the user wearing head mounted display device 2. Lightguide optical element 112 also allows light from in front of the head mounted display device 2 to be transmitted through lightguide optical element 112 to the user's eye thereby allowing the user to have an actual direct view of the space in front of head mounted display device 2 in addition to receiving a virtual image from microdisplay 120. Thus, the walls of lightguide optical element 112 are see-through. Lightguide optical element 112 includes a first reflecting element 124 (e.g., a mirror or other surface). Light from microdisplay 120 passes through lens system 122 and becomes incident on reflecting element 124. The reflecting element 124 reflects the incident light from the microdisplay 120 such that light is trapped inside a planar, substrate comprising lightguide optical element 112 by internal reflection.

After several reflections off the surfaces of the substrate, the trapped light waves reach an array of selectively reflecting surfaces 126. Shown is one of the five surfaces 126 to prevent over-crowding of the drawing. Reflecting surfaces 126 couple the light waves incident upon those reflecting surfaces out of the substrate into the eye of the user. More details of a lightguide optical element can be found in United States Patent Application Publication 2008/0285140, Ser. No. 12/214,366, published on Nov. 20, 2008, "Substrate-Guided Optical Devices" incorporated herein by reference in its entirety. In one embodiment, each eye will have its own lightguide optical element 112.

FIG. 5D is a top view of a fourth embodiment of a movable display optical system of a see-through, near-eye, mixed reality device including an arrangement of gaze detection elements. This embodiment is similar to FIG. 5C's embodiment including a light guide optical element 112. However, the light detectors are the IR photodetectors 152, so this embodiment relies on glint detection for gaze detection as discussed in the examples below.

In the embodiments of FIGS. 5A-5D, the positions of the gaze detection elements, e.g. the detection area 139 and the illuminators 153 and photodetectors 152 are fixed with respect to each other. In these examples, they are also fixed in relation to the optical axis of the display optical system 14.

In the embodiments above, the specific number of lenses shown are just examples. Other numbers and configurations of lenses operating on the same principles may be used. Additionally, in the examples above, the right side of the see-through, near-eye display device 2 is shown. A full near-eye, mixed reality display device may include as examples another set of lenses 116 and/or 118, another lightguide optical element 112 for the embodiments of FIGS. 5C and 5D, another microdisplay 120, another lens system 122, likely another environment facing camera 113, another eye tracking sensor 134 for the embodiments of FIGS. 6A to 6C, earphones 130, and a temperature sensor 138.

Figure 6B:
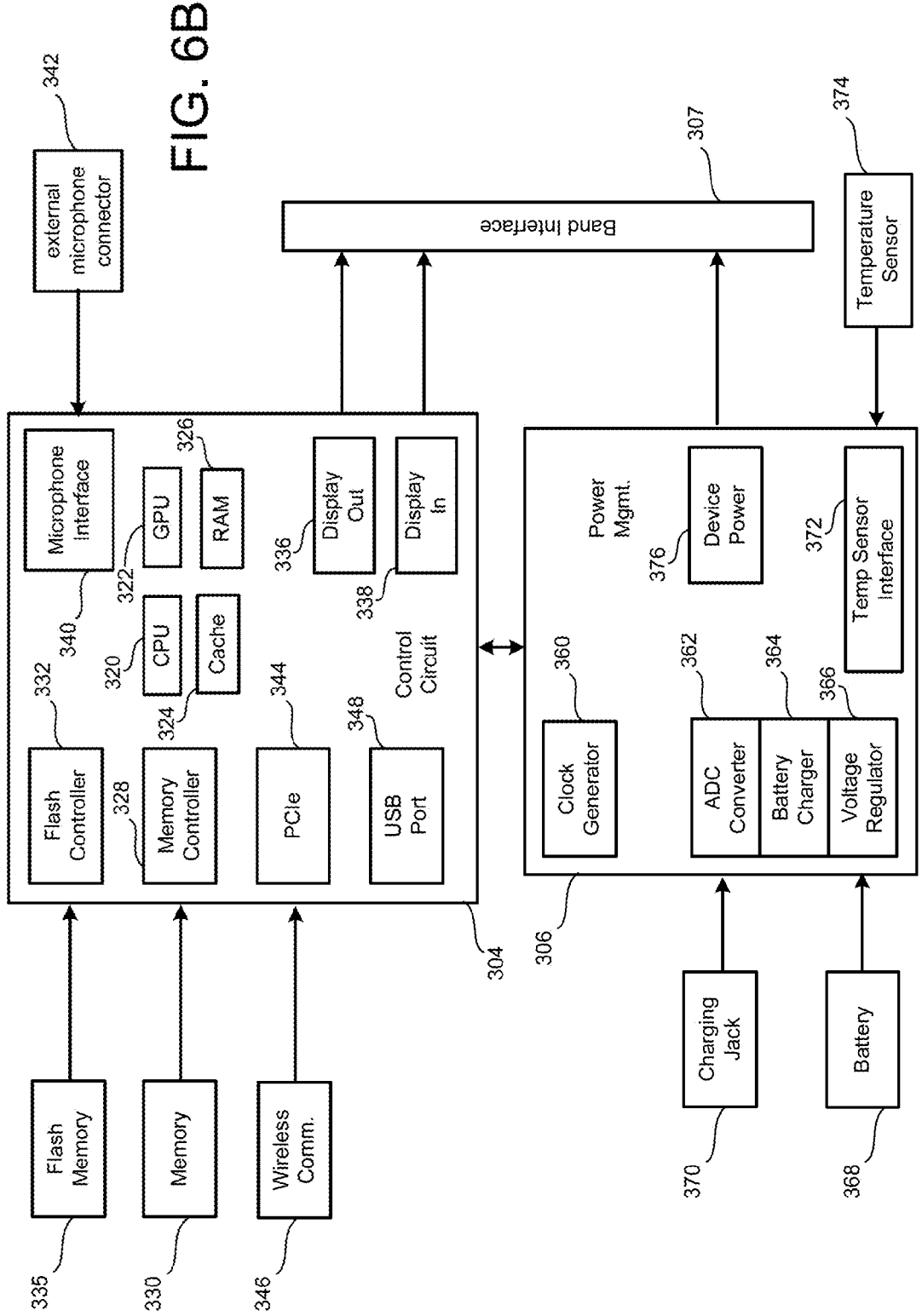
FIG. 6B is a block diagram of one embodiment of the hardware and software components of a processing unit associated with a see-through, near-eye, mixed reality display unit.
Figure 7B:
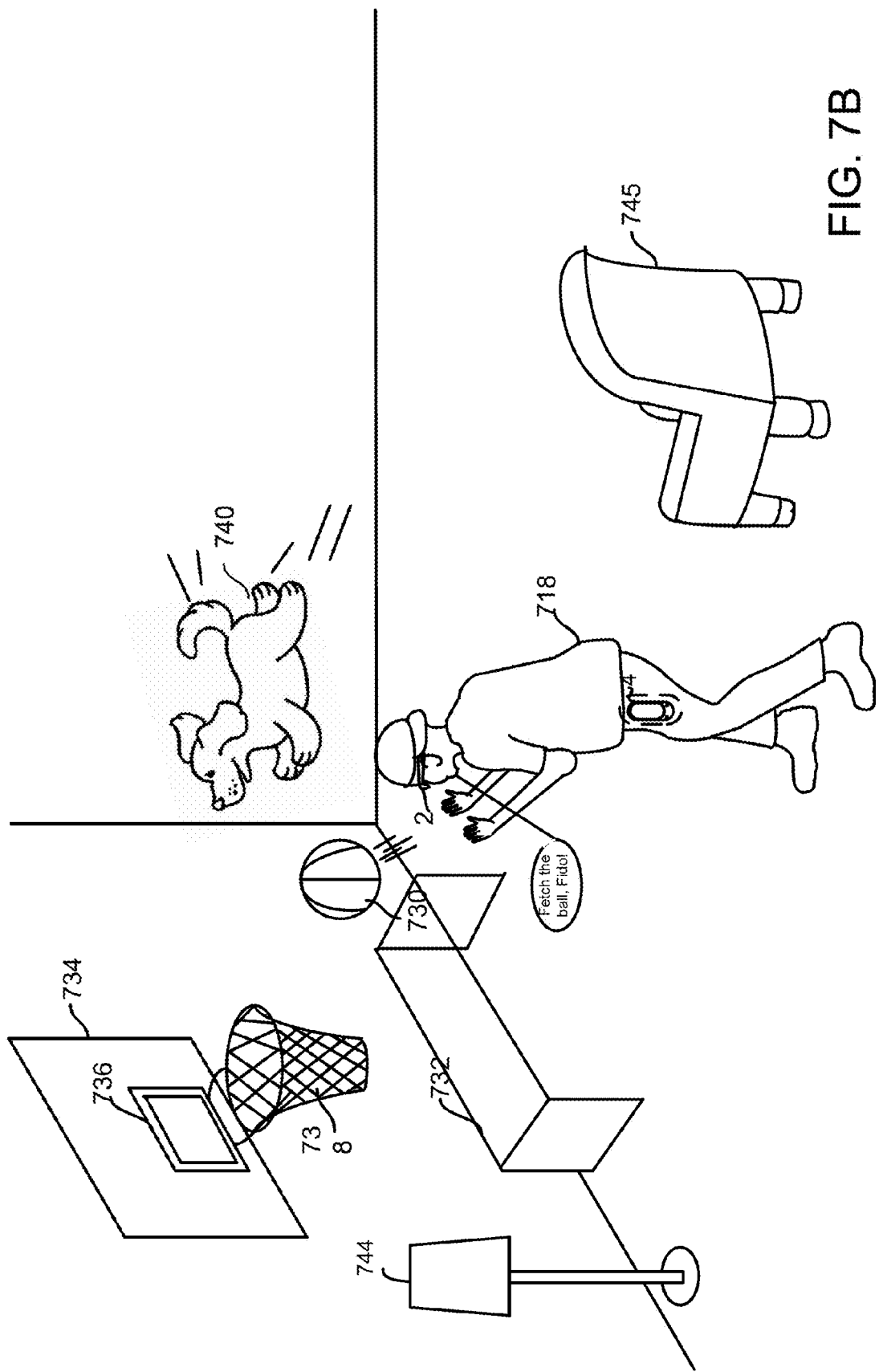
FIG. 7B is a depiction the environment of FIG. 7A showing a virtual object with different physical abilities than a corresponding real world object.

FIG. 6A is a block diagram of one embodiment of hardware and software components of a see-through, near-eye, mixed reality display unit 2 as may be used with one or more embodiments. FIG. 7B is a block diagram describing the various components of a processing unit 4. In this embodiment, near-eye display device 2, receives instructions about a virtual image from processing unit 4 and provides the sensor information back to processing unit 4. Software and hardware components which may be embodied in a processing unit 4 are depicted in FIG. 6B, will receive the sensory information from the display device 2 (See FIG. 1A). Based on that information, processing unit 4 will determine where and when to provide a virtual image to the user and send instructions accordingly to the control circuitry 136 of the display device 2.

Note that some of the components of FIG. 6A (e.g., physical environment facing camera 113, eye sensor 134, variable virtual focus adjuster 135, detection area 139, microdisplay 120, illuminators 153, earphones 130, temperature sensor 138, display adjustment mechanism 203) are shown in shadow to indicate that there are at least two of each of those devices, at least one for the left side and at least one for the right side of head mounted display device 2. FIG. 6A shows the control circuit 200 in communication with the power management unit 202. Control circuit 200 includes processor 210, memory controller 212 in communication with memory 214 (e.g., D-RAM), camera interface 216, camera buffer 218, display driver 220, display formatter 222, timing generator 226, display out 228, and display in interface 230. In one embodiment, all of components of driver 220 are in communication with each other via dedicated lines of one or more buses. In another embodiment, each of the components of control circuit 200 are in communication with processor 210.

Camera interface 216 provides an interface to the two physical environment facing cameras 113 and each eye sensor 134 and stores respective images received from the cameras 113, 134 in camera buffer 218. Display driver 220 will drive microdisplay 120. Display formatter 222 may provide information, about the virtual image being displayed on microdisplay 120 to one or more processors of one or more computer systems, e.g. 4, 210 performing processing for the augmented reality system. Timing generator 226 is used to provide timing data for the system. Display out 228 is a buffer for providing images from physical environment facing cameras 113 and the eye sensors 134 to the processing unit 4. Display interface 230 is a buffer for receiving images such as a virtual image to be displayed on microdisplay 120. Display out 228 and display interface 230 communicate with band interface 232 which is an interface to processing unit 4.

Power management unit 202 includes voltage regulator 234, eye tracking illumination driver 236, variable adjuster driver 237, photodetector interface 239, audio DAC and amplifier 238, microphone preamplifier and audio ADC 240, temperature sensor interface 242, display adjustment mechanism driver(s) 245 and clock generator 244. Voltage regulator 234 receives power from processing unit 4 via band interface 232 and provides that power to the other components of head mounted display device 2. Illumination driver 236 controls, for example via a drive current or voltage, the illuminators 153 to operate about a predetermined wavelength or within a wavelength range. Audio DAC and amplifier 238 receives the audio information from earphones 130. Microphone preamplifier and audio ADC 240 provides an interface for microphone 110. Temperature sensor interface 242 is an interface for temperature sensor 138. One or more display adjustment drivers 245 provide control signals to one or more motors or other devices making up each display adjustment mechanism 203 which represent adjustment amounts of movement in at least one of three directions. Power management unit 202 also provides power and receives data back from three axis magnetometer 132A, three axis gyro 132B and three axis accelerometer 132C. Power management unit 202 also provides power and receives data back from and sends data to GPS transceiver 144.

The variable adjuster driver 237 provides a control signal, for example a drive current or a drive voltage, to the adjuster 135 to move one or more elements of the microdisplay assembly 173 to achieve a displacement for a focal region calculated by software executing in a processor 210 of the control circuitry 13, or the processing unit 4, or both. In embodiments of sweeping through a range of displacements and, hence, a range of focal regions, the variable adjuster driver 237 receives timing signals from the timing generator 226, or alternatively, the clock generator 244 to operate at a programmed rate or frequency.

The photodetector interface 239 performs any analog to digital conversion used for voltage or current readings from each photodetector, stores the readings in a processor readable format in memory via the memory controller 212, and monitors the operation parameters of the photodetectors 152 such as temperature and wavelength accuracy.

FIG. 6B is a block diagram of one embodiment of the hardware and software components of a processing unit 4 associated with a see-through, near-eye, mixed reality display unit. The processing unit 4 may include this embodiment of hardware and software components as well as similar components which perform similar functions. FIG. 6B shows controls circuit 304 in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 335 (or other type of non-volatile storage), display out buffer 336 in communication with see-through, near-eye display device 2 via band interface 307 and band interface 232, display in buffer 338 in communication with near-eye display device 2 via band interface 307 and band interface 232, microphone interface 340 in communication with an external microphone connector 342 for connecting to a microphone, PCI express interface for connecting to a wireless communication component 346, and USB port(s) 348.

In one embodiment, wireless communication component 346 can include a Wi-Fi enabled communication device, Bluetooth communication device, infrared communication device, etc. The USB port can be used to dock the processing unit 4 to a secondary computing device in order to load data or software onto processing unit 4, as well as charge processing unit 4. In one embodiment, CPU 320 and GPU 322 are the main workhorses for determining where, when and how to insert images into the view of the user.

Power management circuit 306 includes clock generator 360, analog to digital converter 362, battery charger 364, voltage regulator 366, see-through, near-eye display power interface 376, and temperature sensor interface 372 in communication with temperature sensor 374 (located on the wrist band of processing unit 4). An alternating current to digital converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. Device power interface 376 provides power to the display device 2.

The system described above can be used to add virtual images to a user's view such that the virtual images are mixed with real images that the user see. In one example, the virtual images are added in a manner such that they appear to be part of the original scene. Examples of adding the virtual images can be found U.S. patent application Ser. No. 13/112,919, "Event Augmentation With Real-Time Information," filed on May 20, 2011; and U.S. patent application Ser. No. 12/905,952, "Fusing Virtual Content Into Real Content," filed on Oct. 15, 2010; both applications are incorporated herein by reference in their entirety.

To provide a mixed reality environment wherein natural user interactions with virtual objects can be learned by a display system, a multitude of inputs is monitored to determine and link input actions by a user to aspects of a virtual object, including functions of the virtual object. Virtual objects may have functions and physical actions/reactions that mimic real world objects, or which may be unrelated to real world objects. In this context, functions may alter physical state, object actions and object responses to an input, such as a user input. Each virtual object may be rendered through an understanding of a description of the object used by the display device to render the object and interactions between the object and other real and virtual objects. In order to learn new functions and inputs, the description of the object may be modified to reflect the new inputs and functions. In order to make the interaction with the objects as natural for humans as possible, a multitude of inputs may be used to provide input data creating the input actions which drive the functions of a virtual object.

FIG. 7A illustrates an environment in which a user 718 is wearing a display system 10 comprising a display device 2 and a processing environment 4. In the environment illustrated in FIG. 7A, a number of real and virtual objects are presented. Real objects include a chair 745, table 732 and lamp 744. Virtual objects include a basketball 730, a dog 740, a backboard 734, target 736 and net 378. The virtual objects of the basketball 730 and dog 740 can be programmed to react in a manner similar to their real-world counterparts. That is, basketball 730 can be programmed to bounce off of backboard 734 and into the basket 738 in a manner similar to a real basketball. Likewise, dog 740 can be programmed to run around the environment 750, bark, and do tricks much as a real dog might.

In addition to acting as their real-world counterparts, virtual objects can be programmed to perform actions which are unrelated to their real-world counterparts. In one example, as shown in FIG. 7B, a dog can be programmed to fly. To enable the dog to fly, different functions and physical actions not generally associated with a virtual object which attempts to duplicate the performance of a real-world dog may be associated with the virtual object dog. In order to create a virtual flying dog from a virtual object dog that is not programmed to fly, an object may to "learn" the flying function as well as an input command that indicates that a user wants the virtual dog to start flying.

In FIG. 7A, where the virtual dog 740 mimics the actions of a real world dog, the verbal command "fetch the ball, Fido" may result in the dog running after the ball and returning it to the user. In FIG. 7B, a verbal command "fetch the ball Fido" may cause the dog to fly. The virtual dog 740 is rendered to fly by modifying the base description of the object used to render the dog 740 with a flying function. This function may be a combination of a change to the physical definition of a dog (the virtual object's physical reactions e.g. weight and movement) as well as learning and linking an input command that indicates that the user is instructing the virtual dog to fly.

Human interaction may take a variety of forms. There are many different type of interactions which cause an effect in another human being or in an environment. Returning to the example of a real-world dog, to command a dog to sit, one may verbally instruct the dog to sit, one may snap their fingers, or one may use a hand signal, all of which the dog knows as a command to sit and may result in the "function" of the dog sitting.

FIG. 7C illustrates various actions an individual can take with respect to another individual. All of which are used to gain a user's attention. For example, at 752, one user may say something verbally to another user; at 754, the user may tap another user on the shoulder, at 756 a user may waive their arms; at 758 a user may make eye contact with another user; at 760, a user may escalate their voice and motion; at 762 a user may throw something in front of a viewer; at 764 a user may step on the other user's foot; and at 768 a user may snap their fingers. Each of these actions may be detectable by the system 10. For example, at 752 when a user says something, a sound system will detect the audio. When a tap on the shoulder is made at 752, a image data and motion tracking in the system 10 will detect this contact. Each of the actions illustrated in FIG. 7C can be detectable by the system 10.

FIG. 7D illustrates that each of the various types of input of the system 10 can be utilized between a user 770 and a virtual object 780 as inputs 782 to create a functional response in the virtual object 780. These inputs include voice, contact, hand tracking, inertial movement, eye tracking, environment detection, controller detection, personalization elements, or location. Taken together, the components comprise a listening system which can provide collect and monitor a variety of actions by a user and change the existing inputs which create a reaction in an object by enabling a function, allow a user to create new functions for the object by manipulating the object and detecting which input the user desires to enable those functions, and do so in a manner which is relatively "natural" to the user. That is, for each of the examples shown in FIG. 7C, the system can detect that each of the motion and actions is, in fact, desired by the user to gain the attention of another user. Similarly, any of the motions and actions set forth in FIG. 7C could be utilized to control the flying of the virtual dog.

Figure 8:
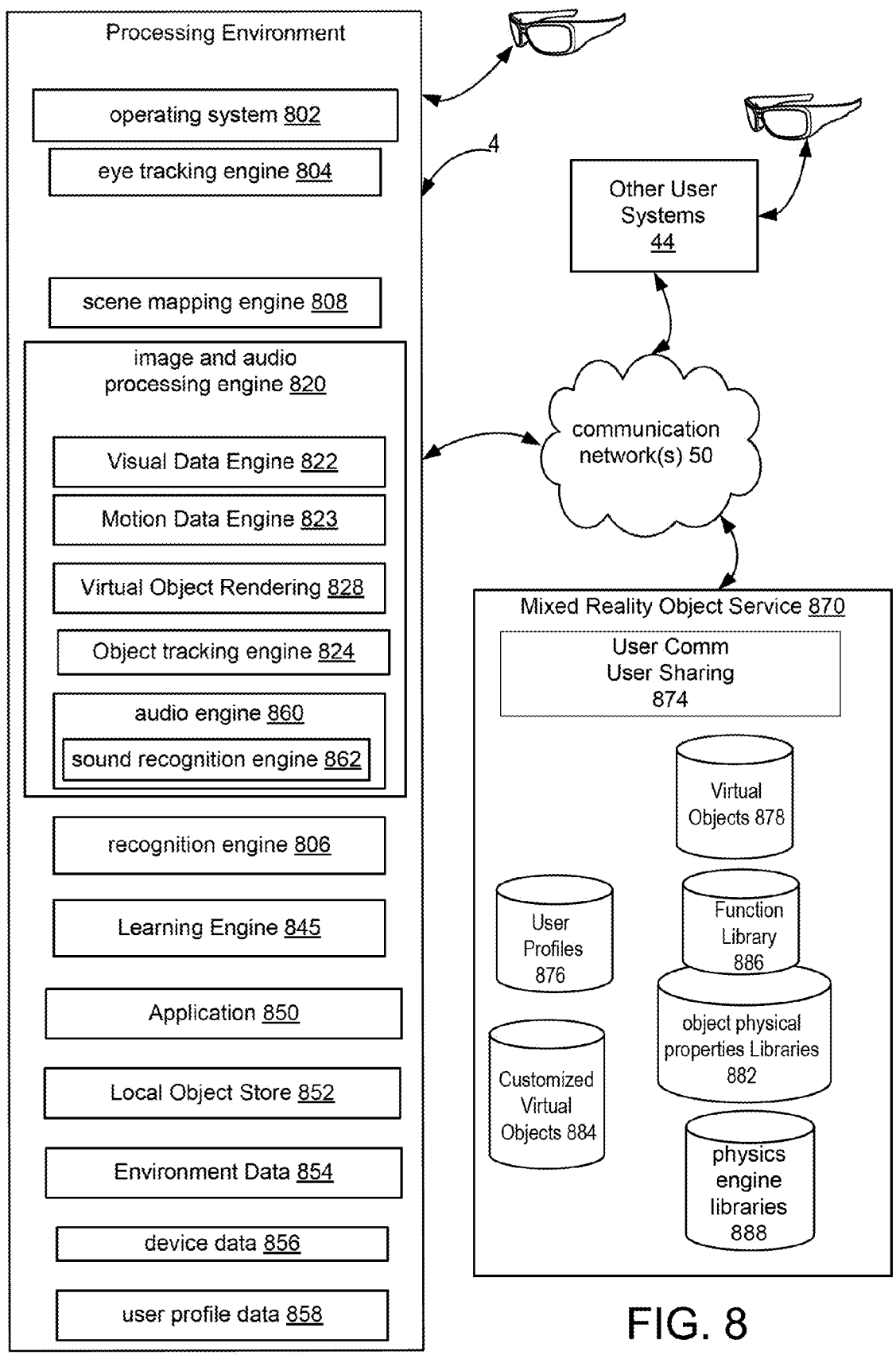
FIG. 8 is a block diagram of software functions in a processing unit of a see through head mounted display device.

FIG. 8 illustrates the functional components of the processing environment for a mixed reality object handling service 870 relative to communication networks 50 and other user systems. FIG. 8 is a block diagram of the system from a software perspective for providing a mixed reality environment within see through head mounted mixed reality system 10, including the components operating in a processing unit 4. FIG. 8 illustrates a processing unit 4 from a software perspective which may be implemented the system 10, one or more remote computing systems 12 in communication with one or more systems 10, or a combination of these. Network connectivity allows leveraging available computing resources including a mixed reality object service 870 and shared elements from other user system 44 which may be display systems 10.

As shown in the embodiment of FIG. 8, the software components of a processing unit 4 comprise an operating system 802, eye tracking engine 804, input recognition engine 806, scene mapping engine 808, image and audio processing engine 820, an input recognition engine 806, a learning engine 845, mixed reality application 850, local object store 852, environment data 854, device data 856, and user profile data 858. Image and audio processing engine 820 includes a visual data engine 822, a motion data engine 823, an audio engine 860, virtual object rendering engine 828 and object tracking engine 824. Not illustrated are image and audio data buffers which provide memory for receiving image data captured from hardware elements on the device 2.

Operating system 802 provides the underlying structure to allow hardware elements in the processing unit 4 to interact with the higher level functions of the functional components shown in FIG. 8.

Eye tracking engine 804 tracks the user gaze with respect to movements of the eye relative to the device 2. Eye tracking engine 804 can identify the gaze direction or a point of gaze based on people position and eye movements and determine a command or request.

Input recognition engine 806 may identify actions performed by a user indicating a control or command to an executing application 850. The input action may be performed by a body part of a user e.g. a hand or a finger, but also may include a eye blink sequence, a verbal utterance, motion, a series of user motions or any combination of motions, sounds and actions of a user which may be perceived by a system 10. In one embodiment, the input recognition engine 806 includes a collection of gesture filters, each comprising information concerning a gesture that may be performed by at least a part of a skeletal model. The recognition engine 806 compares skeletal model and movements associated with it derived from the captured image added to the gesture filters in an input action library to identify when a user has performed one or more gestures. In some examples, matching an image data to image models of a user's hand or finger during a gesture may be used rather than skeletal tracking for recognizing gestures.

Image and audio processing engine 820 processes image data depth and audio data received from one or more captured devices which might be available in a given location. Image and audio processing engine 820 processes image data (e.g. video or image), depth and audio data received from one or more captured devices which may be available from the device. Image and depth information may come from outward facing sensors captured as the user moves his or her body. A 3D mapping of the display field of view of the augmented reality display device 2 can be determined by the scene mapping engine 808, based on captured image data and depth data for the display field of view. A depth map can represent the captured image data and depth data. A view dependent coordinate system may be used for mapping of the display field of view as how interactions between object appear to a user depends on the user's point of view. An example of the view dependent coordinate system is an X, Y, Z, coordinate system in which the Z-axis or depth axis extends orthogonally or as a normal from the front of a see through display device 2. At some examples, the image and depth data for the depth map are presented in the display field of view is received from cameras 113 on the front of display device 2. The display field of view may be determined remotely or using a set of environment data 854 which is previously provided based on a previous mapping using the scene mapping engine 808.

An object tracking engine 824 tracks each of the objects in a user's field of view, both virtual and real, to object instances maintained in the processing unit 4. When virtual object rendering engine 828 renders an object in a display device 2, instances of the object are maintained by the object tracking engine 824 to understand the position of the virtual object relative to the coordinate system in use. Object recognition engine 826 keeps track of movements and positions of real and virtual objects within an environment, allowing the rendering engine 828 to provide object interactions based on the virtual objects provided by the application 850.

The virtual object rendering engine 828 may utilize data from the local object store 852 and local environment data 854 to create virtual objects within an environment. In addition, objects may be available from the mixed reality object service 870. Objects available from the mixed reality object service 870 may include shared objects from other user system 44, objects prepared by application providers for use with applications 850, and elements used to create customized or learned actions relative to user-specific virtual objects.

Virtual object rendering engine 828 renders each instance of a three dimensional holographic virtual object within the display of a display device 2. Object rendering engine 828 works in conjunction with object tracking engine 824 to track the positions of virtual objects within the display. The virtual objects rendering engine 828 uses the object definition contained within the local object store as well as the instance of the object created in the processing engine 820 and the definition of the objects visual and physical parameters to render the object within the device. The rendering engine 828 uses the physics data which is provided in the definition to control movement of any virtual objects rendered in the display and interprets various rendered object definitions to display interactions of objects. Local object store 852 contains object definitions which may be associated with the user, or cached object definitions provided by a mixed reality object service 870. Environment data 854 may contain a three dimensional mapping of a user environment as well as one or more preconfigured environment comprising a series of objects associated with physical environment. Device data 856 may include information identifying the specific device including an identifier for the processing unit 4 including, for example, a network address, an IP address, and other configuration parameters of the specific device in use.

User profile data 858 includes user specific information such as user specific objects, and preferences associated with one or more users of the device.

Learning engine 845 tracks user actions relative to input actions and results or desired functions to create new input actions and functions for virtual objects. The learning engine 845 may update a definition of a virtual object to include new functionality and/or new input actions which enable new or existing functionality. A customized object is then produced, with the customized object having an association with a user in one embodiment. Users may choose to share their customized objects from the local store with other users via a mixed reality service 870 or in a peer-to-peer fashion.

Learning engine 865 is provided which allows different inputs actions with respect to a given virtual object to be mapped to these functions. Generally, a system 10 will include a set of known inputs which enable known functions. There may be three different types of mappings which can occur. In the learning engine 845, known input actions may be mapped to new functions. Similarly, a new input may be mapped to a known function. Finally, unknown or new inputs may be mapped to new functions In some embodiments, a mixed reality object service 870 may be provided. The mixed reality object service 870 may comprise one or more computers operating to provide a service via communication network 50 in conjunction with each of the processing unit 4 coupled as part of a mixed reality display system 10. The mixed reality object handling service 870 can include a user communication and sharing engine 874, a user profile store 876, a virtual object store 878, user owned objects 884, object physical properties libraries 882, functional libraries 886 and physics engine libraries 888.

The mixed reality object service 870 provides definitions of virtual objects where an application 850 may call for a virtual object to provide to the rendering engine 828. In this context, object store 878 may provide, for example, a set of virtual objects created by application providers and accessible to processing units 4.

User communication and sharing engine 874 allows processing unit 4 and other user system 44 to connect to the mixed reality service 870, submit customized objects and user data, share objects between users, and access virtual objects provided by application providers. It should be understood that in other embodiments, various users may communicate using systems 20 in a peer-to-peer manner, so that customized virtual objects may be shared between users without the use of a mixed reality object service.

The user profile store 876 may include information identifying the user to the mixed reality object service 870 and allowing that service to provide user owned objects and generic object libraries to different processing environments. Customized virtual object 884 may comprise objects which have been created by various learning engines 845 of processing unit 4 and other users system 44 and which are provided to the management service 870.

The communication and sharing engine 874 may access physical properties libraries 882, physics engine libraries 888 and function libraries 886 in creating a object definitions and customized objects. The function libraries 886 contains a variety of functions that can be linked to virtual objects to add functionality to the objects. Functions may or may not include interfaces to the real world environment where the user is present. For example, virtual objects may interface with a light switch input to turn on a real light in a room. Similar interfaces can be provided for myriad connections to real world impacts. Physics engine libraries 888 contain physics definitions for virtual objects and physical properties libraries 88 contain various physical properties, all of which can be combined in various manners to create different, custom objects. When a user modifies a virtual dog object as shown in FIG. 7B, one or more functions from the function library and one or more attributes from the physics libraries 888 may be used to modify the dog object. The function libraries 886 maintains the input actions which are linked to respective functions to enable the function.

Similarly, as a user modifies an instance of an object rendered and stored on processing unit 4, additional functions from the function libraries 886, changes in the physics parameters of a virtual object from the physics engine libraries 888 and changes to the object physical properties from the physical properties libraries 882 can be accessed by the processing unit 4 to make modifications to user objects.

User communication and user sharing in 874 allows users on other systems 44 to interact via the mixed reality object handling service 870 with instances of the objects identified by the tracking engine 872. Direct communication between the systems 44 and processing unit 4 may occur, or processing may be handled by the mixed object reality service. Such processing may include handling of collisions, occlusion, and other information. In one embodiment, each processing unit 4 includes an object tracking engine 824 which tracks other user's objects as well as objects which are defined by the virtual object rendering engine 828 to ascertain how interactions between both user objects and objects from other users may be handled.

User profiles store 876 information identifying users, user-specific systems 10, and links to user owned objects which may be used to enhance a user experience with a system 10.

Figure 9:
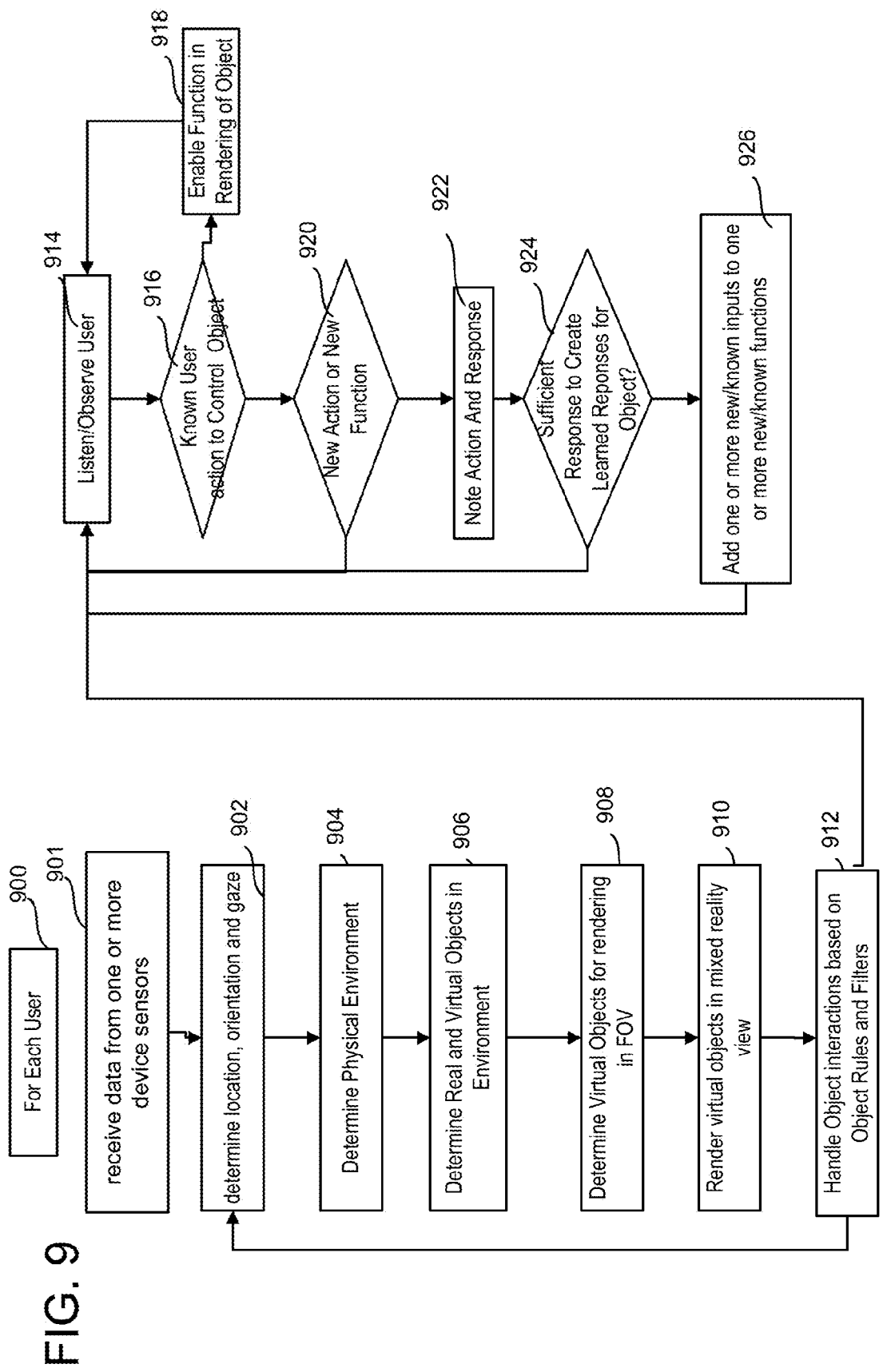
FIG. 9 is a flowchart illustrating a method of providing a mixed reality environment with learned functions.

FIG. 9 illustrates a general method for rendering and tracking objects in accordance with the present technology. It may be understood that the method of FIG. 9 is performed by a see through head mounted display device 2 in conjunction with the processing unit 4. In some contexts, the steps of FIG. 9 may be performed by a server in conjunction with the see through head mounted display device 2. Certain steps in the process of FIG. 9 are not illustrated. For example, when a user first puts a see through head mounted display device on, an initialization sequence will register the movements of the user to the device, additionally, user's position in a global coordinate system, such as a global positioning system (GPS) may be determined. Alternatively, once initialized, the system is prepared to understand the environment and where to render virtual objects.

In addition, where a user allows personal information such as location, biometric or identification information to be used by the system 10, the user may be asked to take an affirmative action before the data is collected. In addition or in the alternative, a user may be provided with the opportunity take an affirmative action to prevent the collection of data before that data is collected. This consent may be provided during an initialization phase of the system 10.

For each user at 900, sensor data from any or all of the sensors described with respect to FIGS. 1-6 is received. At step 902, the user's location, orientation, and gaze within the display device to are determined. The user's gaze, orientation and location may determine the user's field of view and what objects are within the user's field of view and may be within the user's potential field of view in his surrounding environment. It may be understood that the user's location may be a relative location. That is, the location may not be a location relative to any world positioning system, but may be registered to a local environment where the user is located or relative to the user himself. At 904, the physical environment is determined. One method for determining the physical environment involves mapping the user's real world environment using data gathered by the see through head mounted display device 2. This mapping step can determine the physical boundaries of the user's environment as well as determining which objects are within the physical environment. At step 906, real objects and virtual objects within user environment are determined. Step 906 can be performed by using data gathered by display device 2 from which real items within the user's environment are identified. Alternatively, a stored environment known to contain certain real and virtual objects ban be used. For example, if the user is sitting in the user's living room, it is likely that the user's previous definition of this environment will be known and can be used by the display device 2. That is, the furniture will likely not have moved, the television will remain in the same place, and the table and chairs will also be in the same positions they were before. Even slight movements of these physical objects could be recognized by the system. Once real objects in the environment are known and identified, the real world objects are mapped to real world object definitions.

Once all real world objects are identified at 906, virtual objects for rendering in the user environment at 906 are determined. The determination of virtual objects at 906 may occur in a number of ways. In one embodiment, virtual objects are provided by an application running within the processing device for of the display system. Different applications may allow users to use virtual objects in different ways. In one example, virtual objects can be displayed to allow users to play games or interact with a virtual dog as shown in FIG. 7A.

As noted briefly above, each real object and each virtual object is characterized in the system by an object definition. Various types and structures may be used to create an instance of a virtual object. One such structure is identified in co-pending application Ser. No. 13/532,636 entitled "OBJECT-CENTRIC MIXED REALITY SPACE", inventors Peter Tobias Kinnebrew and Nicholas Ferianc Kamuda, filed Jun. 25, 2012, assigned to the assignee of the present application and hereby fully incorporated by reference herein.

Once the virtual objects are determined at 906, the virtual objects which may to be rendered in a user field of view are determined at 908. Not all virtual objects in a user environment may be rendered in a user field of view. Whether an object is to be rendered depends on where the user is looking and their position relative to the virtual objects. Once field of view objects are determined at 908, objects are rendered in the mixed reality view by device 2 at step 910. At 912, the system then handles interactions based on object rules and system filters in a manner, for example, as described in the application entitled OBJECT-CENTRIC MIXED REALITY SPACE cited above.

Steps 901-912 may repeated continuously for each user as objects are rendered within the user field of view. In parallel, with the provision and rendering of virtual objects in the mixed reality environment, a learning method illustrated at steps 914-926 may operate to create associate known inputs to new functions, create new input actions for known functions, and/or create new input actions and new functions.

The method illustrated at 914-926 may be performed as a learning engine 845. In one embodiment, steps 914-926 operate continuously and without user intervention, tracking input actions and responses as a user interacts with an environment and objects within the environment. In another alternative, a user may choose to actively instruct a system 10 to learn a new input action or a new function.

At step 914, the system 10 listens and observes user actions, interactions and movements within an environment. Each of the elements described above with respect to FIG. 7D and each of the sensors described above with respect to FIGS. 1-6B, are used as input to listen to and observe user actions and interactions within an environment. At 916 when a user makes a known action which controls an object, that function in the object is enabled at 918. This may be simply moving a virtual object by pushing the object, or may engage a more complex function such as adjusting the volume of a real world audio system using a hand waving motion, or clapping in order to instruct a virtual dog to fly. When a user performs an unknown action, that unknown action may engender a response in real objects and virtual objects. For example, when a user snaps his fingers and another person turns around, the input "snap fingers" may associated with the reaction of the user. Similarly, when a user snaps his fingers and simultaneously or states "fetch the ball, Fido", the snapping command can be associated with the verbal command to fetch the ball.

In this instance, a known input action—finger snapping—can be associated with a different known function—making the dog fetch. Similarly, if the finger snapping action is not a known input action to any function, the action of finger snapping—identified by the motion of the finger and the sound made by the snap—can be identified as a new input action and mapped to the known action of making Fido fetch.

Some responses or functions may not be known to the system 10. For example, the flying function may not be associated with any virtual objects in an environment but the system may learn the dog should fly based on input actions from a user. Learning a function for a virtual object may include attaching a function from another object (or from the function library) or creating a new function.

At 920, if a new input action or new function is observed, if a known input creates a new response function, or if a known function is associated with a new input action, at 922, the action and the response is noted. In one embodiment, a single association between an input action and a function or response may create an association between the two. In other embodiments, the action/function association is not made until a pattern emerges between the input actions and response. At 922, actions may be stored and submitted to a method which determines whether or not there has been a sufficient frequency and correlation between a response to the input action to create a learned response for an object. For example, with respect to the virtual dog, one may wish to utter the phrase, "fetch the ball, Fido" some minimum number of times while snapping their fingers in order for the system to associate snapping their fingers with the dog.

In order to draw a correlation between an action and a response, the learning engine may draw correlations between the inputs described below with respect to FIG. 11 and the function characteristics which may describe a function set forth in FIG. 12. For example, an observed audio input that generates a movement response in an object (either real or virtual) can be determined by the system to comprise an input action and a function responding to that input action. More complex combinations of input actions and observed responses describe complex inputs and functions.

At 924 a determination is made as to whether to associate an input action with a function. As noted above, frequency of occurrence between the actions and the functions may be one method of making this determination. Exact duplication between the input actions and responses may not be utilized to create the association. For example, slight changes in a user action or verbal command may still be sufficient to create personalized input actions which vary by user and by occurrence. For example, a user may throw a virtual ball to the virtual dog to create a response of having the dog retrieve the ball. The act of throwing the ball may be overhand in one instance and underhand in another instance. Each occurrence of throwing the ball may create the same response in the virtual dog, but with a slightly different input action.

Once a sufficient response and action relationship has been determined at 924, a new action and function relationship is created at 926 by adding one or more inputs to one or more functions. As noted above, step 926 may be performed by a user initiating a relationship between input actions and functions.

Figure 10:
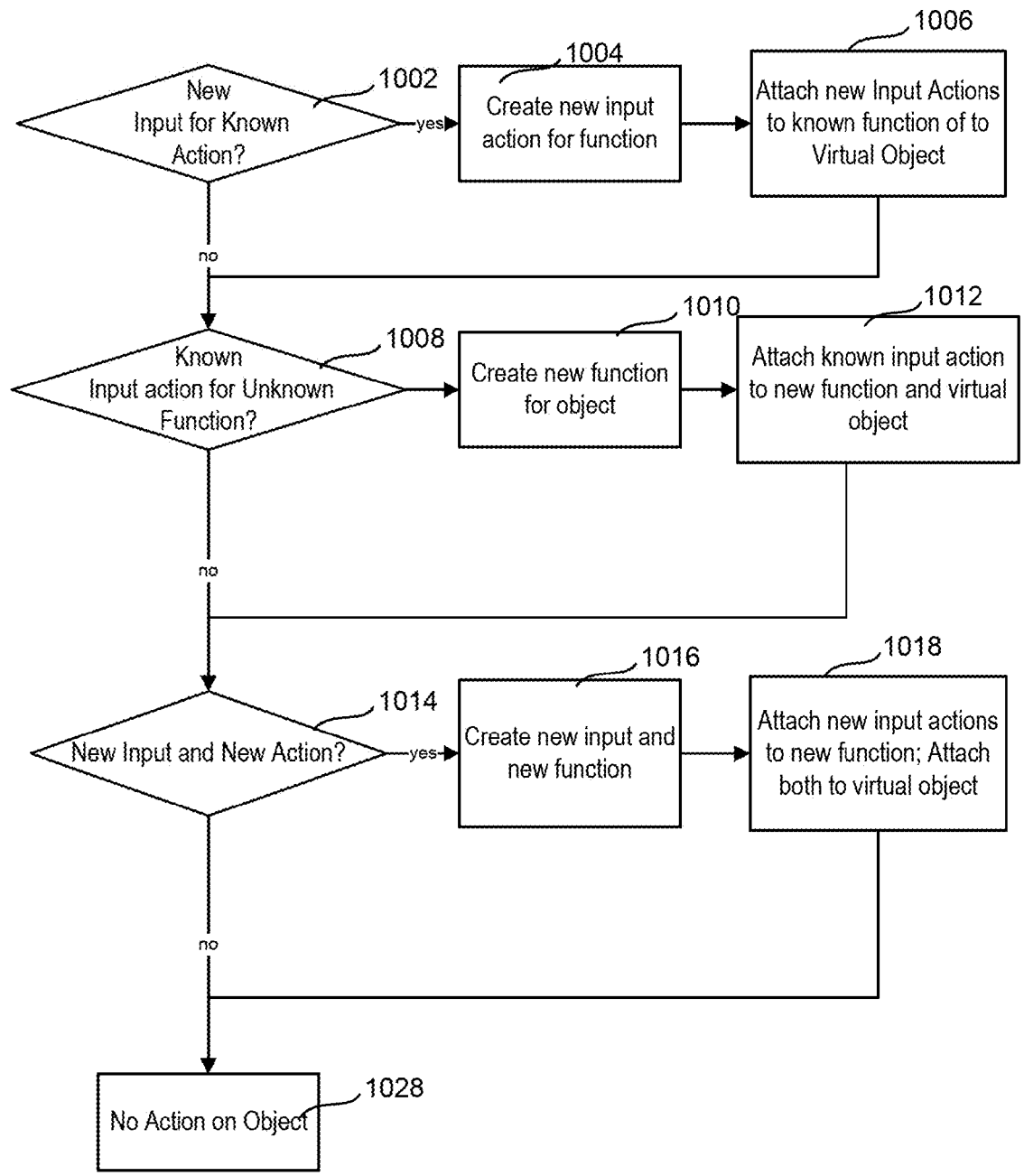
FIG. 10 is a flowchart illustrating a step in FIG. 9 of adding input and functions to a mixed reality virtual object.

FIG. 10 is a flow chart illustrating one embodiment of FIG. 9 at step 926 for associating a new or known input action with a new or known action. At step 1002, a determination is made as to whether or not the action which generates an input to a function is a new input for a known action. For example, if the dog knows to bark when a user calls his name, but does not do anything when a user snaps his fingers, and the snapping finger action is not known to act as an input for any function, then the snapping finger action is a new input. The dog barking is a known action. Because a new input is being used, an action definition for the new action may be created at 1004. That is, the system may understand that snapping the fingers is an input to a function. Once the system understands the snapping of fingers as a new input, the input action is associated with the function (barking) and this activity (input+function) is added to the virtual object at 1006.

The foregoing description is a relatively basic description of a new input at a known action. It may be understood from the foregoing that much more complex types of inputs and much more complex functions may be utilized in accordance with the present technology. For example, combinations of the actions set forth in FIG. 7C can be utilized in order to gain a user's attention. For example, a user may both speak to another individual, and tap them on the shoulder. This comprises a combined input of two different of actions both leading to the same result (getting the second user's attention). It should be further understood that the number of functions linked to a given input or combination of inputs is not limited to a single function, but functions may also be chained together as a series or sequence of functions.

If at 1008 the input is not a new input but rather a known input and the action or function for which the input is being used is not known to the system, then a new function may be created at 1010 and the input actions added to the new function at 1012, with the functions thereafter associated with the virtual object and the new function. Using the aforementioned example, if a user issues a voice command to the virtual dog to "fetch the ball, Fido" the dog can perform the function of seeking the virtual ball. However, if the same command "fetch the ball, Fido" is used to cause the dog to fly, and the dog was not previously linked to a flying function, then the function of flying may be associated with the dog. However, the input verbal command is known. At step 1010, the new function is created in the input actions associated with the function of flying and the dog at 1012.

At 1014, if both a new input and a new action are being utilized, then both the new action input and the new function may be defined at 1016 and these actions and inputs associated with the virtual object at 1018. A method for creating a new action is discussed below with respect to FIG. 11.

Figure 11:
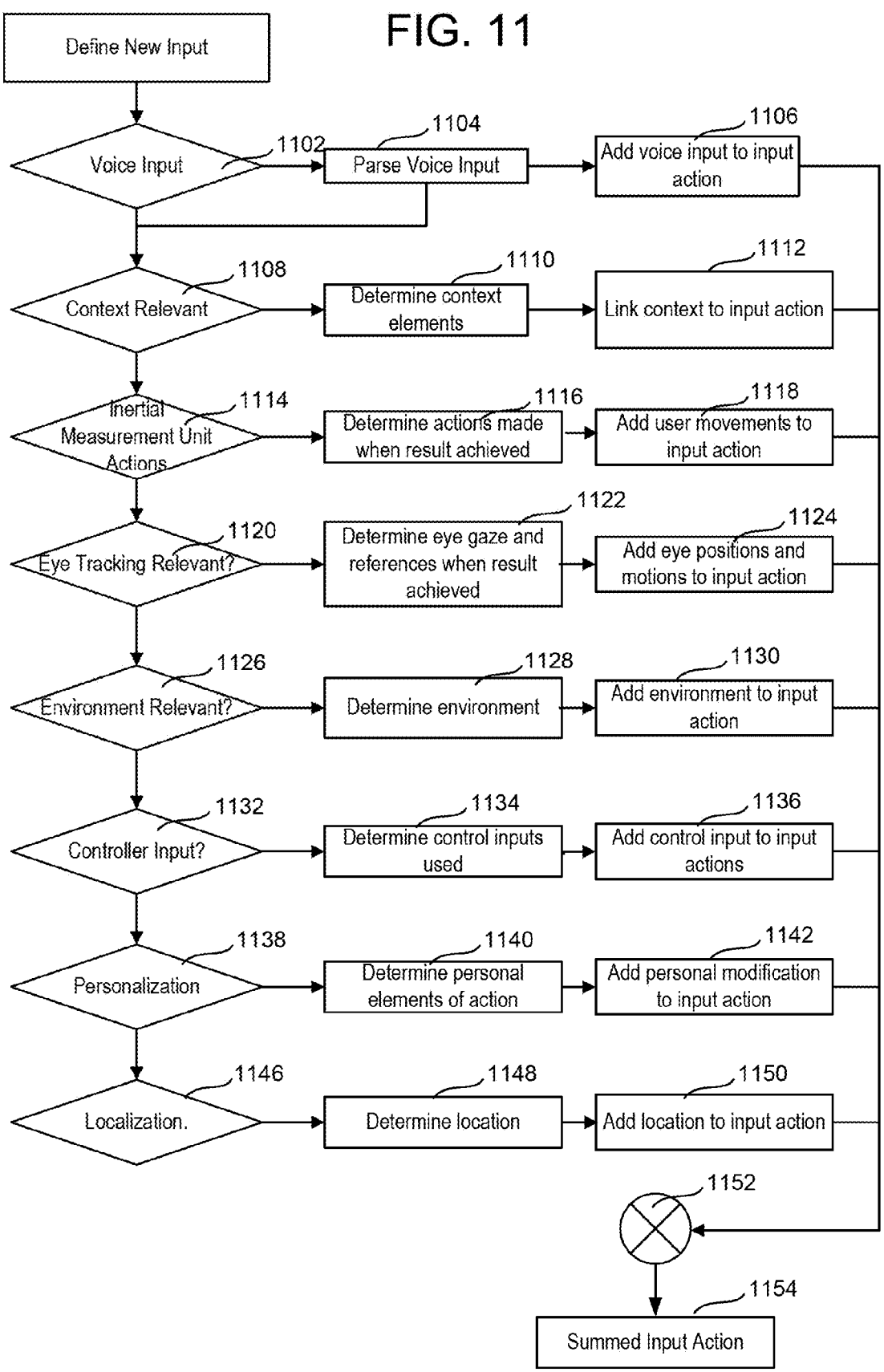
FIG. 11 is a flowchart illustrating a step of FIG. 10 for defining a new input.

FIG. 11 illustrates a method for creating a new input action for association with a function. As illustrated in FIG. 11, several types of input are provided, any combination of which can be utilized as an input action. These include voice input 1102, context relevancy at 1108, inertial movements at 1114, eye tracking at 1120, environment relevancy at 1126, controller input at 1132, personalization at 1138, and localization at 1146.

Voice input includes audio commands uttered by a user, as well as ambient or other audible input. If a voice input is provided at 1102, the voice input may be parsed for a certain command words at 1104 and the voice input added to the input action at 1106. Determining context relevancy at 1108 includes evaluating the context that a particular input action may be provided. For example, if the user is playing a virtual game and utters the word "fire" this utterance is in a different context than a user wishing to start a virtual fire in a virtual fireplace in their living room. The context of the game is different from the context of a user in a living room. Whether there is context relevancy at 1108 is determined from the input action, an evaluation of the environment, running applications, actions of other users and the presence of real or virtual elements in the environment at 1110. If context is determined to be relevant, and links to the context elements in which the input action may appear are created at 1112 and added to the input action. User movements detected by the inertial measurement components of the system 10 are evaluated at 1114. If the user is moving at 1114, user movements associate with the input action are determined at 1116 and movements made are associated with the input action. User movements are actions added to the input action at 1118. At 1120, eye tracking and user focus relevancy is evaluated. The position, focus and movement of a user's eyes relative to a display device 2 may, for example, determine which of several virtual objects in a user field of view to which the input action is directed. If eye tracking and user focus is relevant at step 1120, then the eye actions and focus are determined at 1122, and the eye positions and motions are added to the input action 1124. Environment relevancy is determined at step 1126. If the environment is determined to be relevant to the input action, then the environment context is determined at 1128 and the environment added to the input action 1130.

In certain instances, the mixed reality device can provide an input controller as a virtual object. The input controller can take any number of different forms and if the user provides control input to virtual objects in a user field of view via this controller in combination with other input action. If a virtual control input is provides, control relevancy is determined at 1132. The controller input relevancies recorded at 1134 and the controller input added to the input action at 1136. If personalization is present in the input action at 1138, the personalized elements of the input action are added at 1140. Personalization includes the particular manner in which a user performs an action. As noted above, a user may not perform the same action in exactly the same way on multiple occasions. For example, to throw the ball to a virtual dog and have the ball chase it, a person may throw the ball overhand in one instance and underhand in another. In both cases, the user may wish the virtual dog to retrieve the ball. Personalization aspects of an input action are added at 1142. Localization includes the position of the user relative to other virtual elements or real elements in a particular environment. If localization is relevant at 1146, then the localization is determined at 1148 and added to the input action at 1150. Each of the elements of the input action are summed at 1152 into a summed input action at 1154. The summed input action comprises a new input action which may be utilized to implement a function of a virtual object.

Figure 12:
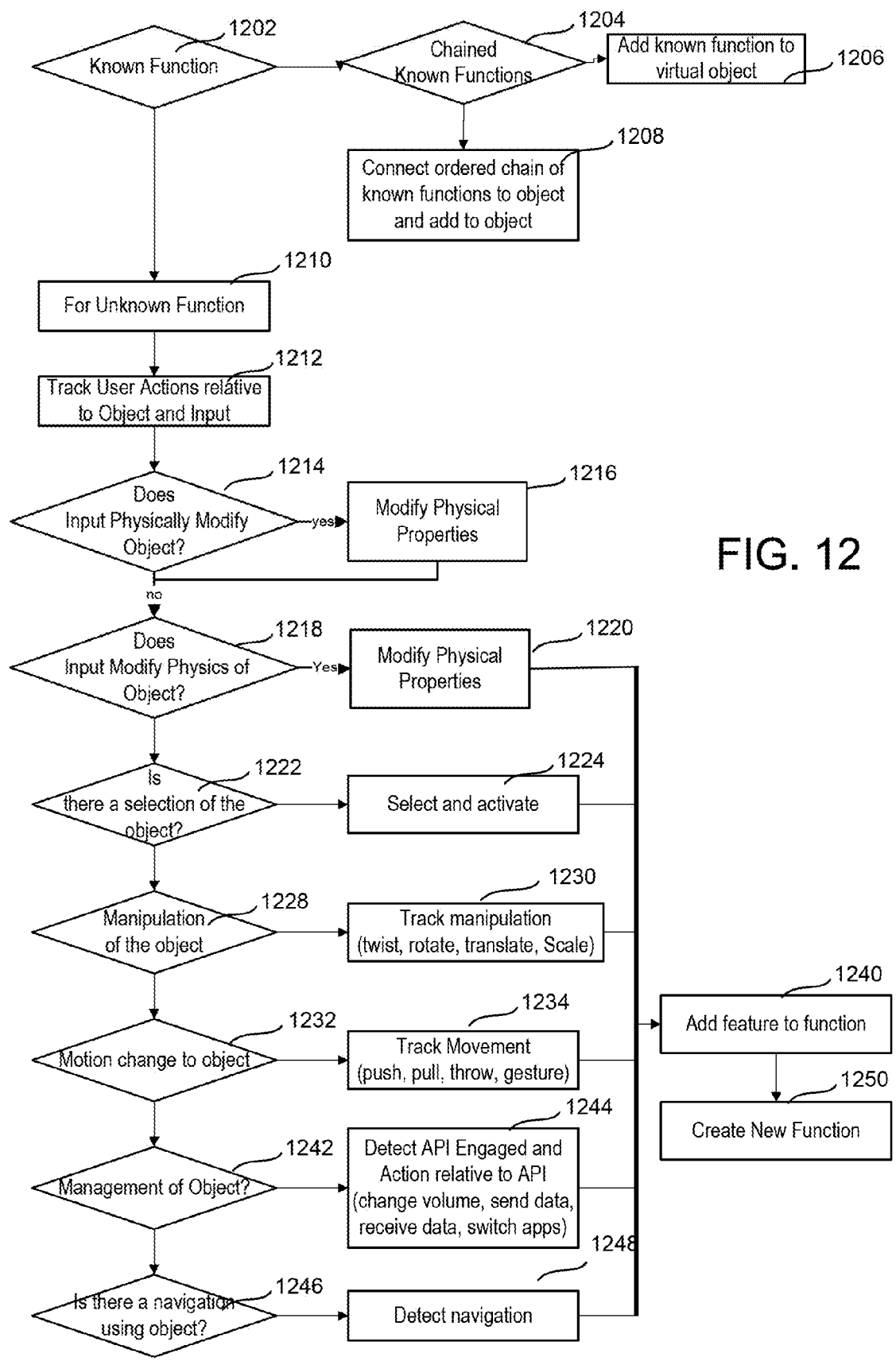
FIG. 12 is a flowchart illustrating a step of FIG. 10 for creating a new function.

FIG. 12 is a method illustrating a method for creating a function in accordance with steps 1006 and 1018.

In FIG. 12, at step 1202, if a known function is found, then a determination is made as to whether a chain of known functions is used at 1204 and if not, the chained functions are added to the virtual object at 1206. If the new function is a chain of known functions at 1204, than an ordered chain of known functions is created at 1208 and added to the object.

For any unknown function at 1210, user actions are tracked relative to virtual objects and device input. The device inputs can be the same as those set forth in FIG. 11.

Each of the device inputs may reflect an input on a virtual object and a desired result on that virtual object. At 1214, the method determines whether or not input physically modifies an object. For example, if the object is a virtual soda can and the user crushes the soda can, this will create an altered state for the virtual object. If the user wishes to crush the soda can by snapping his fingers, this input may physically modify the state of the soda can and a new rendering of the soda can in the altered state may be provided. If so, the physical properties of the object are modified at 1216.

At 1218, a determination is made as to whether the input modifies the physics of the object. For example, does the function modify whether the virtual dog can fly? If so, the physics properties of the object are modified at 1220. At 1222, determination is made as to whether or not there is a selection of the object in the input action. Selection can include a physical action to manipulate an object, selecting with eye gaze and voice, or using a particular gesture to select a virtual object. If selection of the object occurs, then a select and activate element is added to the function at 1224. At step 1228, determination is made as to whether or not the function includes manipulation of the object. Manipulation can include movements twisting, rotating, translating, and scaling the object. If so, then at 1230 the manipulation is tracked and added to the function's features. At 1232, a determination is made as to whether or not there is a motion to change the object. This can include a push, pull, throw, or other gesture, which is tracked at 1234 and added to the function at 1240. At 1242, a determination is made as to whether or not there is a management of the object. Management can include commands for the object to interact with real world objects or the environment through, for example, an API as illustrated. In certain aspects, the system 10 can interact with physical objects or virtual objects to change their state. This object management function is detected at 1244 and added to the features of the function at 1240. At 1246, a determination is made as to whether or not there is a navigation feature in the function. A navigation feature can include aspects of using the function to position other elements in the environment for specific actions relative to an interface. If so, then at 1248 the navigation is detected and added to the function at 1240.

As noted above, any number of different types of structures may be utilized to save the structure of a virtual object. In one embodiment, an object structure an object control mechanism such as that provided in application Ser. No. 13/532,636 entitled OBJECT-CENTRIC MIXED REALITY SPACE is used.

FIG. 13 is a diagram illustrating another exemplary data structure for a virtual object. At 1302, a virtual object may include, for example, default object functions, new object functions, linked objects, physical data and physics data. Default object functions are those may be defined for a base-level object 1302. For a virtual dog, this may allow the dog to move, respond to commands, and interact with other virtual objects. A base-level object may be created by an application provided and provided to the user's local object store or the object management service 870.

Learned functions include functional attributes 1306 which provide new functions and newly added known functions. Learned attributes 1308 may modify new or known functions.

Linked objects 1310 are objects which are related to a particular object 1302. For example, a virtual object of soda may be linked to a virtual object of a soda can.

Input actions 1304 comprise any of the input actions which enable the functions relative to the object 1302. Input actions may include known input actions and newly created input actions.

FIG. 14 is a method for sharing learned objects. FIG. 14 may in one embodiment comprise a method for performing step 910 in FIG. 9. In one aspect, learned objects from other users can be utilized to provide a richer experience for users of a particular device. At 1402, virtual object data is loaded. If available, local virtual object data is utilized to render the virtual object in a field of view at 1404. At 1406, a check is made to determine whether or not shared objects are available from other users or from object management service 870. If shared objects are available, at 1408 the user may be prompted to choose whether or not the user wishes to utilize custom versions or new versions of virtual objects in the user view. If the user does not want a custom version, then the object is rendered at 1416. If the user does want a new custom version, then the newer custom shared version is retrieved from, for example, object management service 870 and rendered in the system at 1414.

Figure 15:
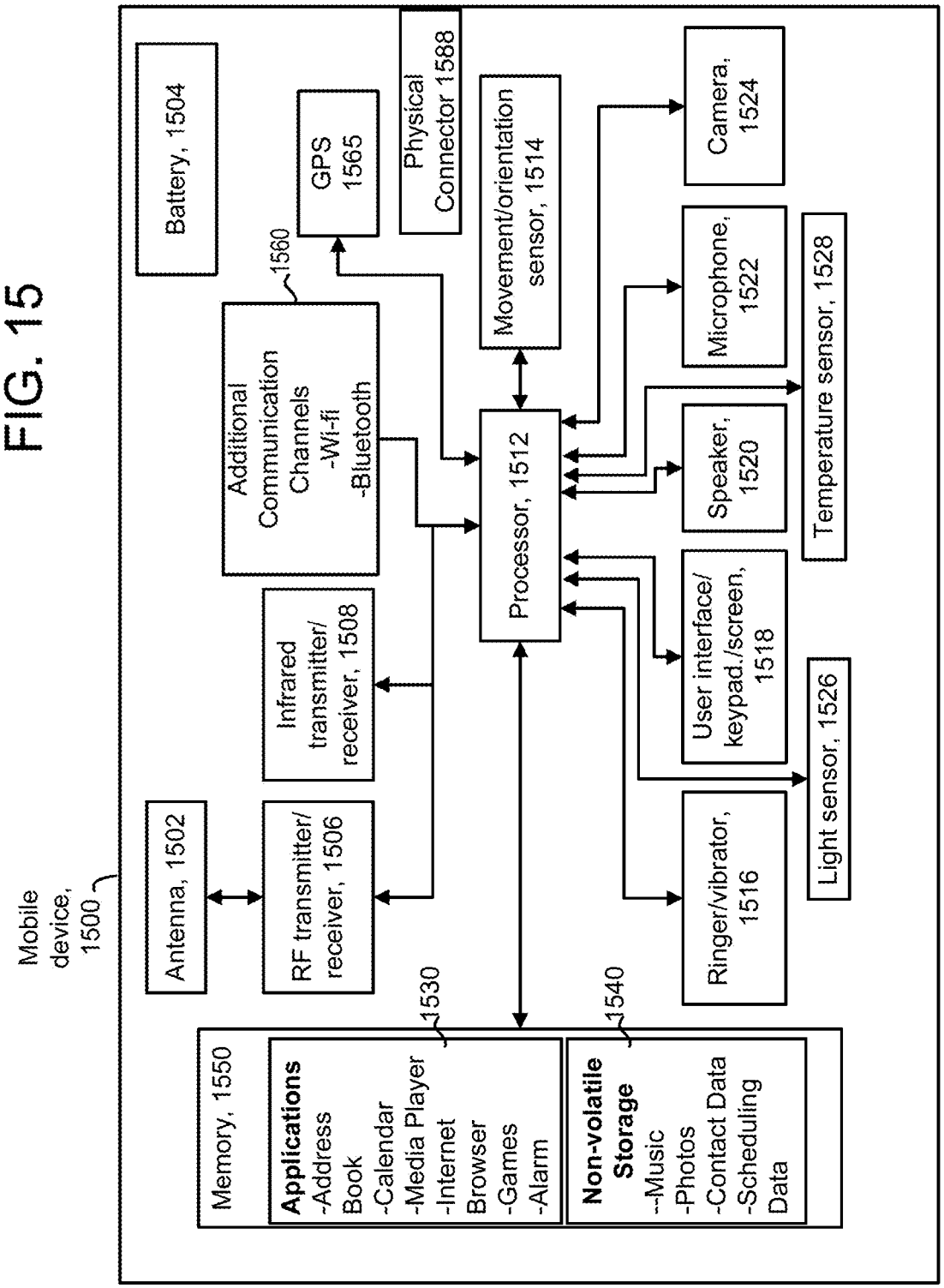
FIG. 15 is a block diagram of an exemplary processing device.

Each of the processing environments, servers and or computers illustrated herein may be implemented by one or more of the processing devices illustrated in FIGS. 14-16.

FIG. 15 is a block diagram of an exemplary mobile device which may operate in embodiments of the technology described herein (e.g. processing unit 4). Exemplary electronic circuitry of a typical mobile phone is depicted. The device 1500 includes one or more microprocessors 1512, and memory 1510 (e.g., non-volatile memory such as ROM and volatile memory such as RAM) which stores processor-readable code which is executed by one or more processors of the control processor 1512 to implement the functionality described herein.

Mobile device 1500 may include, for example, processors 1512, memory 1550 including applications and non-volatile storage. The processor 1512 can implement communications, as well as any number of applications, including the interaction applications discussed herein. Memory 1550 can be any variety of memory storage media types, including non-volatile and volatile memory. A device operating system handles the different operations of the mobile device 1500 and may contain user interfaces for operations, such as placing and receiving phone calls, text messaging, checking voicemail, and the like. The applications 1530 can be any assortment of programs, such as a camera application for photos and/or videos, an address book, a calendar application, a media player, an Internet browser, games, other multimedia applications, an alarm application, other third party applications, the interaction application discussed herein, and the like. The non-volatile storage component 1540 in memory 1510 contains data such as web caches, music, photos, contact data, scheduling data, and other files.

The processor 1512 also communicates with RF transmit/receive circuitry 1506 which in turn is coupled to an antenna 1502, with an infrared transmitted/receiver 1508, with any additional communication channels 1560 like Wi-Fi or Bluetooth, and with a movement/orientation sensor 1514 such as an accelerometer. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 1512 further communicates with a ringer/vibrator 1516, a user interface keypad/screen, biometric sensor system 1518, a speaker 1520, a microphone 1522, a camera 1524, a light sensor 1526 and a temperature sensor 1528.

The processor 1512 controls transmission and reception of wireless signals. During a transmission mode, the processor 1512 provides a voice signal from microphone 1522, or other data signal, to the RF transmit/receive circuitry 1506. The transmit/receive circuitry 1506 transmits the signal to a remote station (e.g., a fixed station, operator, other cellular phones, etc.) for communication through the antenna 1502. The ringer/vibrator 1516 is used to signal an incoming call, text message, calendar reminder, alarm clock reminder, or other notification to the user. During a receiving mode, the transmit/receive circuitry 1506 receives a voice or other data signal from a remote station through the antenna 1502. A received voice signal is provided to the speaker 1520 while other received data signals are also processed appropriately.

Additionally, a physical connector 1588 can be used to connect the mobile device 1500 to an external power source, such as an AC adapter or powered docking station. The physical connector 1588 can also be used as a data connection to a computing device. The data connection allows for operations such as synchronizing mobile device data with the computing data on another device.

A GPS transceiver 1565 utilizing satellite-based radio navigation to relay the position of the user applications is enabled for such service.

The example computer systems illustrated in the Figures include examples of computer readable storage media. Computer readable storage media are also processor readable storage media. Such media may include volatile and non-volatile, removable and non-removable media implemented in any method or technology for storage of information such as computer readable instructions, data structures, program modules or other data. Computer storage media includes, but is not limited to, RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other medium which can be used to store the desired information and which can accessed by a computer.

FIG. 16 is a block diagram of one embodiment of a computing system that can be used to implement a network accessible computing system or a companion processing module. FIG. 17 is a block diagram of one embodiment of a computing system that can be used to implement one or more network accessible computing systems 12 or a processing unit 4 which may host at least some of the software components of computing environment depicted in FIG. 12. With reference to FIG. 16, an exemplary system includes a computing device, such as computing device 1700. In its most basic configuration, computing device 1700 typically includes one or more processing units 1702 including one or more central processing units (CPU) and one or more graphics processing units (GPU). Computing device 1700 also includes memory 1704. Depending on the exact configuration and type of computing device, memory 1704 may include volatile memory 1705 (such as RAM), non-volatile memory 1707 (such as ROM, flash memory, etc.) or some combination of the two. This most basic configuration is illustrated in FIG. 17 by dashed line 1706. Additionally, device 1700 may also have additional features/functionality. For example, device 1700 may also include additional storage (removable and/or non-removable) including, but not limited to, magnetic or optical disks or tape. Such additional storage is illustrated in FIG. 16 by removable storage 1708 and non-removable storage 1710.

Device 1700 may also contain communications connection(s) 1712 such as one or more network interfaces and transceivers that allow the device to communicate with other devices. Device 1700 may also have input device(s) 1714 such as keyboard, mouse, pen, voice input device, touch input device, etc. Output device(s) 1716 such as a display, speakers, printer, etc. may also be included. All these devices are well known in the art and are not discussed at length here.

The example computer systems illustrated in the figures include examples of computer readable storage devices. A computer readable storage device is also a processor readable storage device. Such devices may include volatile and nonvolatile, removable and non-removable memory devices implemented in any method or technology for storage of information such as computer readable instructions, data structures, program modules or other data. Some examples of processor or computer readable storage devices are RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other device which can be used to store the desired information and which can be accessed by a computer In one embodiment, the mixed reality display system 10 can be head mounted display device 2 (or other NV apparatus) in communication with a local processing apparatus (e.g., processing unit 4 of FIG. 1A, or other suitable data processing device). One or more networks 50 can include wired and/or wireless networks, such as a LAN, WAN, WiFi, the Internet, an Intranet, cellular network etc. No specific type of network or communication means is required. In one embodiment, mixed reality object handling service 1270 is implemented in a server coupled to a communication network, but can also be implemented in other types of computing devices (e.g., desktop computers, laptop computers, servers, mobile computing devices, tablet computers, mobile telephones, etc.). Mixed reality object handling service 1270 can be implemented as one computing device or multiple computing devices. In one embodiment, service 1270 is located locally on system 10.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of interpreting commands to a mixed reality environment, comprising:
   rendering one or more virtual objects within a field of view;
   receiving combined input actions with different command types from multiple users corresponding with the virtual objects in the field of view;
   monitoring input actions, the input actions comprising a combination of data from sensors detecting a natural human interaction with a virtual object, associated with the different command types linked to create natural states of input with a same resulting action for
known input actions of the multiple users having a same result enabling known functions of virtual objects;
unknown input actions for which known functions of virtual objects are configured to be enabled,
known input actions for which unknown functions of a virtual object are configured to be enabled such that at least one new function is created and associated with the virtual object;
unknown input actions for which unknown function of a virtual object are configured to be enabled; and
for each unknown input action detected, determining input data resulting in an input action to link to a function; and
for each unknown function, creating a function for the virtual object.

2. The method of claim 1 wherein the method further includes linking known functions to new functions.

3. The method of claim 1 wherein the method further includes linking new input actions to known functions.

4. The method of claim 1 wherein the method further includes linking new input actions to new functions.

5. The method of claim 1 wherein receiving input actions comprises receiving input data from the field of view.

6. The method of claim 5 wherein the input data comprises input from the field of view as one or more of: audio data; depth data; image data; motion data; and focus data.

7. The method of claim 1 wherein the determining input data and creating a function are enabled during a learning mode.

8. The method of claim 1 wherein the determining input data and creating a function are enabled after a plurality of repetitions of input actions related to a same result are monitored in the input data.

9. The method of claim 8 wherein the repetitions of input actions relative to a result are not identical.

10. A see-through head mounted display apparatus, comprising:
a see-through, near-eye, augmented reality display;
one or more processing devices in wireless communication with apparatus, the one or more processing devices determine an environment, one or more real objects in the environment and one or more virtual objects in the environment, the one or more processing devices receive combined input actions with different command types from multiple users corresponding with the one or more virtual objects in a field of view of the display, and monitor received input actions from the multiple users for known input actions having a same result enabling known functions of virtual objects, unknown input actions for which known functions of virtual objects are configured to be enabled, known input actions for which unknown functions of a virtual object are configured to be enabled; and unknown input actions for which unknown function of a virtual object are configured to be enabled; and
the one or more processing devices determining input data resulting in a new input action for a function, and creating a new function for one or more virtual objects based on a correlation between emerging patterns and known inputs for the input action and a response to the input action.

11. The apparatus of claim 10 further including a plurality of input data sensors providing a combination of input comprising: audio data; depth data; image data; motion data; and focus data.

12. The apparatus of claim 10 wherein the one or more processing devices render virtual objects in the environment in the display, at least one of said virtual objects linked to a new input action, including rendering a function in response to input data for the new input action.

13. The apparatus of claim 10 wherein the one or more processing devices render virtual objects in the environment in the display, at least one of said virtual objects linked to a new function, including rendering a the new function in response to input data for the new input action.

14. The apparatus of claim 10 wherein the one or more processing devices determine input data resulting in the new input action and creating a new function after a plurality of repetitions of input actions related to a same result are received in the input data.

15. A method generating new input actions and new functions for virtual objects in a see through head mounted display system, comprising:
rendering virtual objects in an environment, each object having at least a viewable physical representation and behavior, the virtual object responsive to different input actions having different command types;
receiving input data from a plurality of sensors including data representing combined input actions with different command types from multiple users corresponding with virtual and real objects in the environment;
monitoring the input actions, where the input actions comprise a combination of input data from the plurality of sensors detecting a natural human interaction with the virtual object;
the input data summed into a summed input action representing a new input action to implement a function of the virtual object;
determining whether the summed input data represents:
unknown input actions for which a known series of functions of virtual objects are configured to be enabled,
a combination of known input actions from the plurality of sensors from the multiple users for which unknown functions of a virtual object are configured to be enabled with a same result; and
unknown input actions for which unknown functions of a virtual object are configured to be enabled;
for each unknown input action detected, determining input data resulting in the new input action and determining contextual relevancy of the new input action to link to a new function; and
for each unknown function, creating the new function to link to the virtual object;
linking the new input action to the created function, based on the contextual relevancy, to one or more virtual objects in the environment.

16. The method of claim 15 wherein the rendering includes rendering an object to perform a function when a new input action is received.

17. The method of claim 16 wherein the rendering includes rendering an object to perform a function when input data enabling a new function is received.

18. The method of claim 15 wherein the new function are enabled after a plurality of repetitions of input actions related to a same result are monitored in the input data.

19. The method of claim 15 wherein the new input action comprises input data from one or more combinations of: audio data; depth data; image data; motion data; and focus data.

20. The method claim 15, further comprising rendering learned virtual objects shared from other users and created by other see through head mounted display systems.

* * * * *